US008605091B2

(12) United States Patent
Bradbury et al.

(10) Patent No.: US 8,605,091 B2
(45) Date of Patent: Dec. 10, 2013

(54) ENHANCED POWER DISTRIBUTION UNIT WITH SELF-ORIENTING DISPLAY

(75) Inventors: Colin Bradbury, San Diego, CA (US); Carlos Ramirez, Chula Vista, CA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 1240 days.

(21) Appl. No.: 12/106,199

(22) Filed: Apr. 18, 2008

(65) Prior Publication Data

US 2009/0262138 A1    Oct. 22, 2009

(51) Int. Cl.
| | |
|---|---|
| *G06T 11/20* | (2006.01) |
| *G09G 3/20* | (2006.01) |
| *G09G 3/00* | (2006.01) |
| G09G 5/20 | (2006.01) |
| G09F 9/33 | (2006.01) |

(52) U.S. Cl.
CPC .............. *G06T 11/206* (2013.01); *G06T 11/203* (2013.01); *G09G 5/20* (2013.01); *G09G 3/20* (2013.01); *G09F 9/33* (2013.01)
USPC ........... 345/440; 345/441; 345/442; 345/443; 345/30; 345/31; 345/32; 345/33; 345/55; 348/333.06; 709/200; 709/223; 700/295; 370/389; 363/146

(58) Field of Classification Search
CPC ...... G06T 11/206; G06T 11/203; G09G 5/20; G09G 3/20; G09F 9/33
USPC ............ 345/30–33, 55; 348/333.06; 709/200, 709/223; 700/295; 370/389; 363/146
See application file for complete search history.

(56) References Cited

U.S. PATENT DOCUMENTS

| 2,189,676 | A | | 2/1940 | Pfohl |
|---|---|---|---|---|
| 2,612,597 | A | | 9/1952 | Sherrard |
| 3,265,888 | A | | 8/1966 | Adolphson Jr. |
| 4,581,705 | A | | 4/1986 | Gilker et al. |
| 4,744,044 | A | * | 5/1988 | Stover et al. .................. 708/530 |
| 5,189,408 | A | | 2/1993 | Teicher |
| 5,566,098 | A | | 10/1996 | Lucente et al. |
| 5,784,285 | A | | 7/1998 | Tamaki et al. |
| 5,793,627 | A | * | 8/1998 | Caldes et al. ................. 363/146 |
| 5,883,445 | A | | 3/1999 | Holman |
| 5,971,597 | A | | 10/1999 | Baldwin et al. |
| 5,995,400 | A | * | 11/1999 | Park et al. ..................... 363/146 |

(Continued)

FOREIGN PATENT DOCUMENTS

JP    P2000-332866 A    11/2000

OTHER PUBLICATIONS

Installation Operation Guide, NSI Corporation, Wilsonville, Oregon. At least as early as Feb. 2, 2009.

(Continued)

*Primary Examiner* — Jin-Cheng Wang
(74) *Attorney, Agent, or Firm* — Davis Wright Tremaine LLP; George C. Rondeau, Jr.; Heather M. Colburn

(57) ABSTRACT

An enhanced power distribution unit (PDU) with self-orienting display uses an orientation sensor in conjunction with a microprocessor to properly orient visual display of information by one or more displays of the enhanced PDU. Information displayed can relate to electrical current furnished to one or more power outlets of the enhanced PDU and/or information related to temperature, humidity or other conditions of the enhanced PDU.

35 Claims, 18 Drawing Sheets

(56) References Cited

U.S. PATENT DOCUMENTS

| | | | |
|---|---|---|---|
| 6,109,760 A | 8/2000 | Salatrik et al. | |
| 6,208,325 B1 | 3/2001 | Reddy et al. | |
| 6,441,828 B1 | 8/2002 | Oba et al. | |
| 6,497,656 B1 | 12/2002 | Evans et al. | |
| 6,512,682 B2 | 1/2003 | Cohen et al. | |
| 6,553,336 B1 | 4/2003 | Johnson et al. | |
| 6,567,101 B1 | 5/2003 | Thomas | |
| 6,633,823 B2 | 10/2003 | Bartone et al. | |
| 6,727,868 B2* | 4/2004 | Matsui | 345/30 |
| 6,741,442 B1 | 5/2004 | McNally et al. | |
| 6,827,602 B2 | 12/2004 | Greene et al. | |
| 6,857,760 B2 | 2/2005 | Chien | |
| 6,906,617 B1 | 6/2005 | Van der Meulen | |
| 6,940,272 B2 | 9/2005 | Niv | |
| 7,004,595 B1 | 2/2006 | Stoddard | |
| 7,011,422 B2 | 3/2006 | Robertson et al. | |
| 7,030,868 B2 | 4/2006 | Clapper | |
| 7,036,948 B1 | 5/2006 | Wyatt | |
| 7,046,716 B1 | 5/2006 | Miao | |
| 7,086,892 B2 | 8/2006 | Tanacan et al. | |
| 7,121,707 B2 | 10/2006 | Currie et al. | |
| 7,141,891 B2 | 11/2006 | McNally et al. | |
| 7,166,930 B2* | 1/2007 | Young | 307/64 |
| 7,168,974 B2 | 1/2007 | Feldman et al. | |
| 7,171,461 B2 | 1/2007 | Ewing et al. | |
| 7,196,900 B2 | 3/2007 | Ewing et al. | |
| 7,368,830 B2 | 5/2008 | Cleveland et al. | |
| 2002/0140675 A1 | 10/2002 | Ali et al. | |
| 2003/0050737 A1 | 3/2003 | Osann, Jr. | |
| 2003/0062990 A1 | 4/2003 | Schaeffer, Jr. et al. | |
| 2003/0085870 A1 | 5/2003 | Hinckley | |
| 2003/0136895 A1* | 7/2003 | Ogawa | 250/205 |
| 2003/0161279 A1 | 8/2003 | Sherman | |
| 2004/0034484 A1 | 2/2004 | Solomita, Jr. et al. | |
| 2004/0054905 A1 | 3/2004 | Reader | |
| 2004/0155722 A1 | 8/2004 | Pruchniak | |
| 2004/0164958 A1 | 8/2004 | Park | |
| 2004/0263428 A1 | 12/2004 | Sudo | |
| 2005/0062715 A1 | 3/2005 | Tsuji et al. | |
| 2005/0124209 A1 | 6/2005 | Currie et al. | |
| 2005/0147071 A1 | 7/2005 | Karaoguz et al. | |
| 2005/0156882 A1 | 7/2005 | Manchester | |
| 2005/0185669 A1 | 8/2005 | Welborn et al. | |
| 2005/0190281 A1 | 9/2005 | Lee et al. | |
| 2005/0203987 A1 | 9/2005 | Ewing et al. | |
| 2005/0212764 A1 | 9/2005 | Toba | |
| 2005/0225914 A1* | 10/2005 | King | 361/62 |
| 2005/0231474 A1 | 10/2005 | Su et al. | |
| 2005/0243787 A1 | 11/2005 | Hong et al. | |
| 2006/0094461 A1 | 5/2006 | Hameed et al. | |
| 2006/0259538 A1 | 11/2006 | Ewing et al. | |
| 2007/0076340 A1 | 4/2007 | Ewing et al. | |
| 2007/0081505 A1 | 4/2007 | Roberts | |
| 2007/0112939 A1 | 5/2007 | Wilson et al. | |
| 2007/0130243 A1* | 6/2007 | Ewing et al. | 709/200 |
| 2007/0136453 A1* | 6/2007 | Ewing et al. | 709/223 |
| 2007/0140238 A1* | 6/2007 | Ewing et al. | 370/389 |
| 2007/0193866 A1 | 8/2007 | Eder et al. | |
| 2007/0198748 A1 | 8/2007 | Ametsitsi | |
| 2008/0019068 A1 | 1/2008 | Reynolds et al. | |
| 2008/0082276 A1 | 4/2008 | Rivers et al. | |
| 2008/0136261 A1 | 6/2008 | Mierta | |
| 2008/0225156 A1* | 9/2008 | Kim | 348/333.06 |
| 2008/0238404 A1 | 10/2008 | Ferguson | |
| 2009/0115689 A1* | 5/2009 | Mitsutake | 345/33 |
| 2009/0119039 A1 | 5/2009 | Banister et al. | |
| 2009/0141477 A1 | 6/2009 | Bhosale et al. | |
| 2009/0153438 A1* | 6/2009 | Miller et al. | 345/55 |
| 2009/0192927 A1 | 7/2009 | Berg et al. | |
| 2009/0210178 A1 | 8/2009 | Bieganski | |
| 2009/0234512 A1* | 9/2009 | Ewing et al. | 700/295 |
| 2009/0285189 A1 | 11/2009 | Kim et al. | |
| 2010/0070217 A1 | 3/2010 | Shimada et al. | |
| 2010/0174419 A1 | 7/2010 | Brumfield et al. | |

OTHER PUBLICATIONS

Installation and Operation Guide, NSI Professional Power, Software Revision 1.00, Version A, Mfg. Q2/95, and above, NSI Corporation, pp. 1-2. At least as early as Feb. 2, 2009.

Master/Slave vs Peer-to-Peer Definition, Banner Engineering Corp., 2007.

Graves, Michael, Computer Technology Encyclopedia: Quick Reference for Students and Professionals, 2009 Delmar, Cengage Learning, p. 282.

* cited by examiner

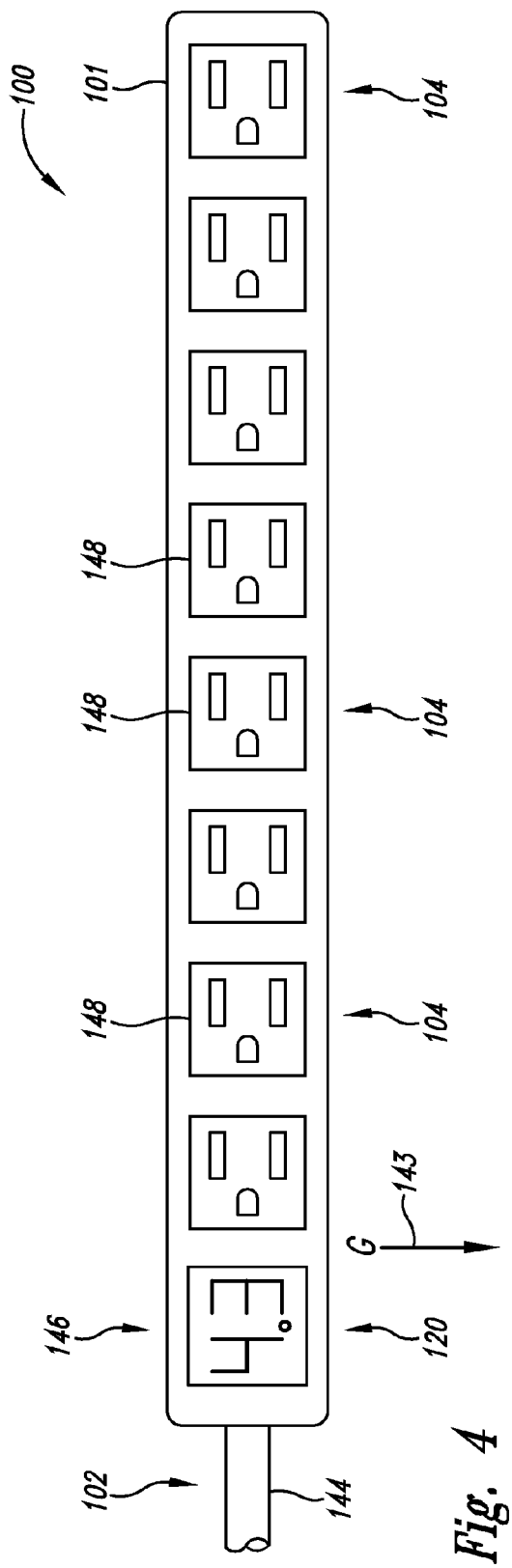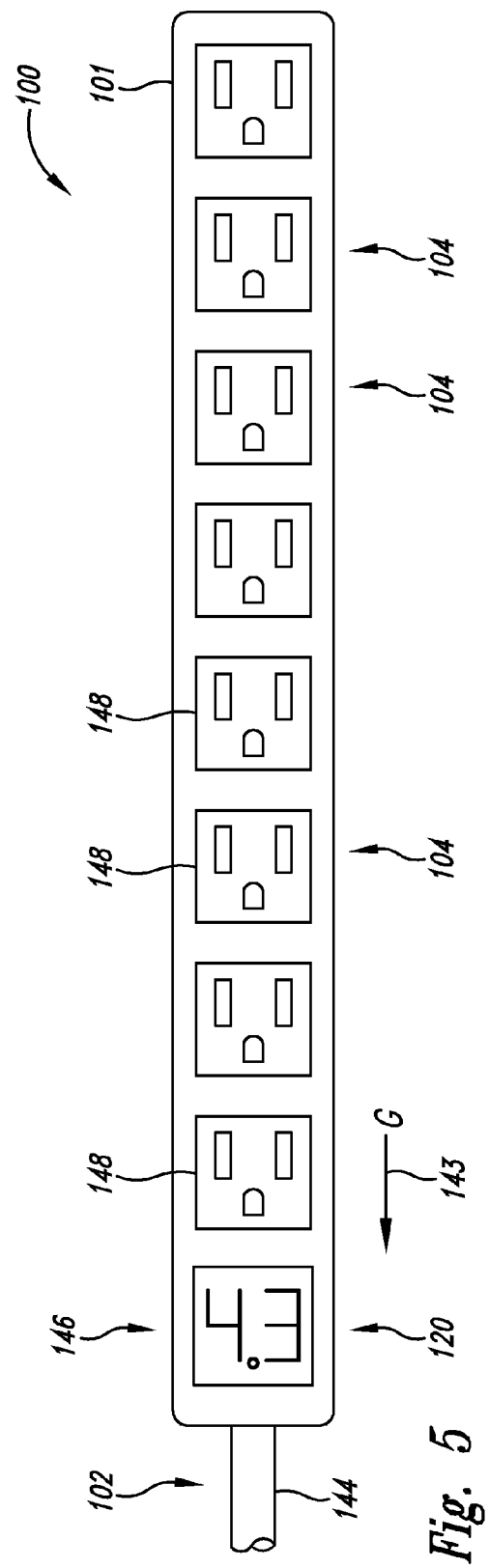

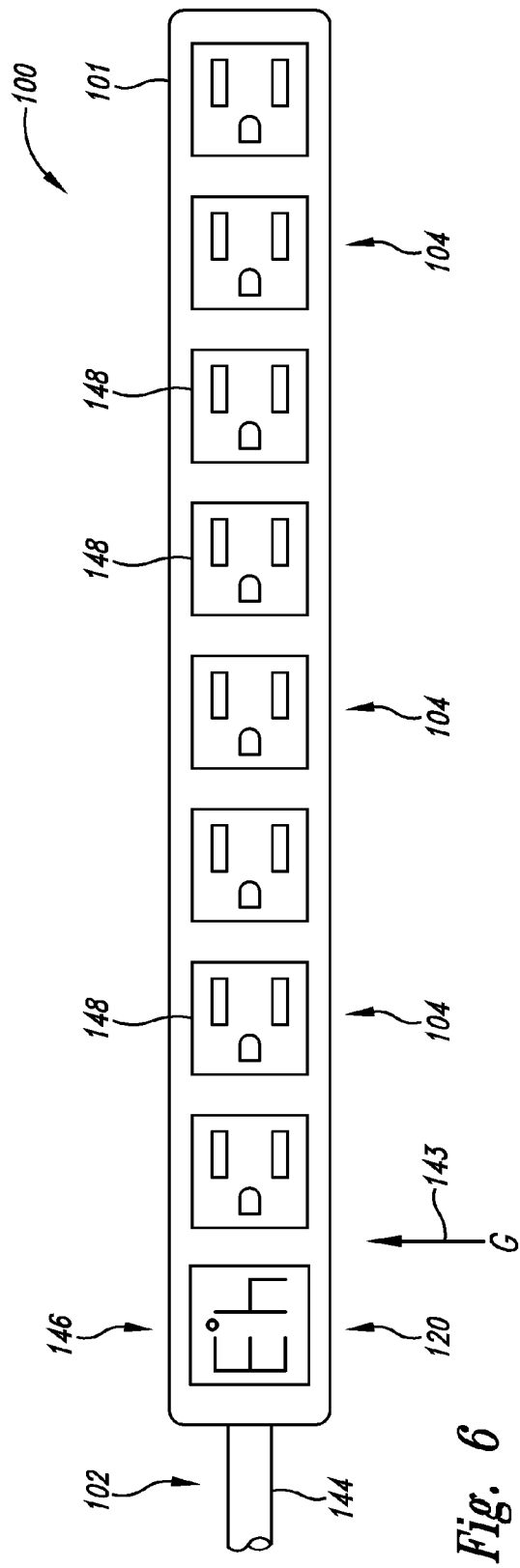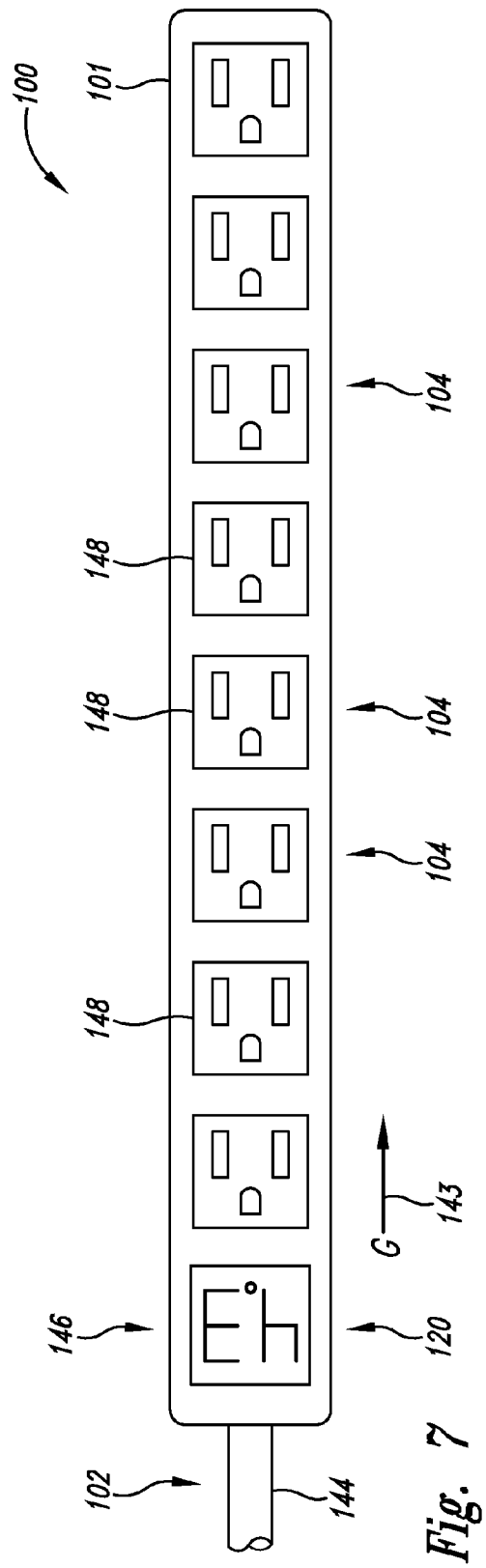

ENHANCED POWER DISTRIBUTION UNIT WITH SELF-ORIENTING DISPLAY

BACKGROUND OF THE INVENTION

1. Field of the Invention

The present invention relates generally to power distribution units.

2. Description of the Related Art

Conventional power distribution units (PDUs) are located in component racks to supply power to the various components in the racks. Typically, a PDU may be placed in a component rack in different positions to accommodate routing of power input cords to the PDU or to provide desired accessibility to the power outlets of the PDU. A conventional PDU can have a display to visually present performance data or other information about the PDU. Unfortunately, due to the different possibilities for positioning of the PDU, proper orientation of the display can be problematic. An incorrect display orientation can cause misinterpretation of the data being presented thereby leading to unintended equipment configurations and potential hazards.

BRIEF DESCRIPTION OF THE SEVERAL VIEWS OF THE DRAWING(S)

FIG. 4 is a schematic depiction of a first version of the PDU of FIG. 1 shown using a first presentation orientation.

FIG. 5 is a schematic depiction of a first version of the PDU of FIG. 1 shown using a second presentation orientation.

FIG. 6 is a schematic depiction of a first version of the PDU of FIG. 1 shown using a third presentation orientation.

FIG. 7 is a schematic depiction of a first version of the PDU of FIG. 1 shown using a fourth presentation orientation.

DETAILED DESCRIPTION OF THE INVENTION

Figure 1:
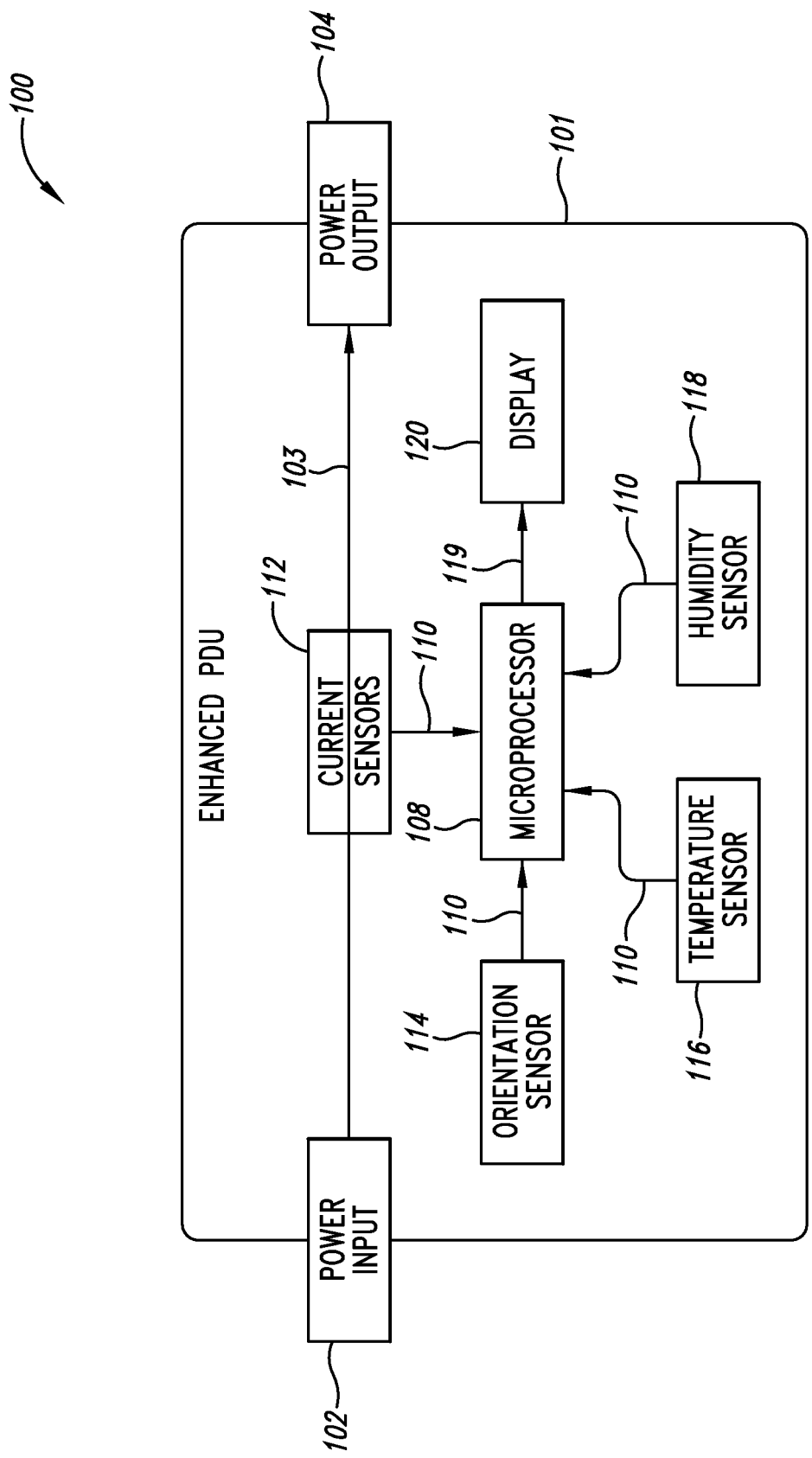
FIG. 1 is a schematic diagram of an exemplary PDU with an enhanced display according to aspects of the present invention.

An enhanced PDU with self-orienting display according to the present invention uses an orientation sensor in conjunction with a microprocessor to properly orient presentation of information by one or more displays of the enhanced PDU. Information displayed can relate to electrical current furnished to one or more power outlets of the enhanced PDU and/or information related to temperature, humidity or other conditions of the enhanced PDU.

In a typical data center and similar facilities, various pieces of equipment are often held in standard 19-inch racks. In order to get electrical power to the various pieces of equipment, a version of the enhanced PDU can be installed in the back of the rack. The enhanced PDU typically has multiple power output sockets and an input portion to receive one or more power input cables. For situations where the power input cables run along the floor, the input portion to receive the power input cables can be located in the face of the enhanced PDU.

For situations where the input power cables run under a false floor, the input portion of the enhanced PDU can be located at an end of the PDU. For situations where the input power cables run overhead in a conduit or false ceiling, the input portion can also be at the end of the PDU, which can be a same version as the under-floor version of the enhanced PDU installed in an inverted orientation. Furthermore, for a case where the input power cables run across the top of the rack; the same version of the enhanced PDU as one used for the power input cables running across the floor can be used in an inverted orientation. For versions of the enhanced PDUs for horizontal installation, it may be desirable to position the input portion on a left or right side of the enhanced PDU. Other versions of the enhanced PDU can be mounted into a component rack along with components to be powered by the enhanced PDU. Rack mount versions of the enhanced PDU can also be positioned on their sides.

Internally, versions of the enhanced PDU can have multiple power inputs whereas other versions of the enhanced PDU can have a single power input having multiple phases with different power output sockets being wired to different combinations of power inputs and/or phases. The input portion of the enhanced PDU can include circuit breakers or other protective devices. It can be desirable to balance a load imposed by various components across the available power supplied to the enhanced PDU by the various power input cables to reduce the likelihood of an overload condition.

To assist with load balancing, the enhanced PDU can display the total amount of current being drawn from each of the power input cables and phases supplied. The enhanced PDU can present this information on one or more displays mounted such as on a face of the enhanced PDU. The displays of the enhanced PDU are typically human-readable and present the information with a reduced likelihood of confusion due to orientation of the display. For instance, versions of the enhanced PDU can display the same information, such as contained in numerical figures, in an easily readable form regardless of whether the enhanced PDU is installed with an upright or an inverted orientation. In some versions of the enhanced PDU, the information to be displayed comes from current sensors attached to the power input lines.

Versions of the enhanced PDU use a low cost and low complexity display including two seven-segment light emitting diode (LED) displays. Each of the seven-segment LED displays has a decimal point. Readings below ten amps can be shown by the two seven-segment LED displays as digit-decimal point-digit whereas readings above ten amps can be displayed as digit-digit. The LED display on the left is installed upright whereas the LED display on the right is installed inverted. Consequently, both decimal points of the two LED displays are positioned in between the two seven segment digit portions of the LED displays with one decimal point being positioned near the bottom of the display and the other decimal point being position near the top of the display. Selective illumination of the LED segments and decimal points can show numerical information in either an upright or inverted orientation. For enhanced PDUs that can be installed one orientation perpendicular to another orientation rather than inverted relative to another orientation, a graphic LCD module where all the pixels can be turned on or off individually can be used to display information. A graphic LCD module can properly display the information in all four orthogonal orientations.

An orientation sensor combined with a microprocessor is included to determine the installed orientation of the enhanced PDU. For detecting an upright or an inverted orientation of the enhanced PDU, the orientation sensor can be as simple as a metal ball resting on two contacts in a plastic tube, or a mercury switch, which also completes a circuit between two contacts. In other implementations the orientation sensor is a conventional solid-state device. For versions of the enhanced PDU that can be installed in more than two orientations, the orientation sensor can be a two-axis solid-state sensor which is conventionally available. If a version of the orientation sensor is susceptible to vibration such as if the version is mechanically based, compensation is provided through the microprocessor by repeatedly sampling the orientation sensor input to the microprocessor with the microprocessor using a voting algorithm (such as two-thirds majority) to determine the PDU orientation.

An enhanced PDU 100 is shown in FIG. 1 to include a housing 101 at least partially enclosing a power input 102, which feed electrical power 103 to a power output 104. The enhanced PDU 100 further includes a microprocessor 108, which receives information signals 110 that inform the microprocessor of various condition states such as electrical current levels, temperature, and humidity from various sensors depicted as including one or more current sensors 112, an orientation sensor 114, a temperature sensor 116, and a humidity sensor 118. The microprocessor 108 processes the information signals 110 and provides an information signal 119 to one or more displays 120 to display the sensed information, such as one or more current levels.

In implementations of the enhanced PDU 100, the power input 102 can include a plurality of wires bundled together into a single electrical cable and a set of circuit breakers mounted on the face of a housing of the enhanced PDU connected so that the circuit breakers can shut off the supply of electrical power into the PDU when an overload condition is detected. In other implementations the power input 102 can include one or more individual electrical wires capable of transferring electrical power into the enhanced PDU 100 or can include a socket or plug mounted on the housing of the enhanced PDU to allow attachment of external electrical wiring or cable to permit the transfer of electrical power into the enhanced PDU.

The power input 102 can also include (a) one or more transformers for converting electrical power at one voltage to electrical power at an internal voltage suitable for distribution to the power output means, (b) one or more surge-suppression circuits that limit the flow of incoming electrical power, (c) one or more capacitive couplings that prevent any direct-current passing into the PDU, (d) one or more rectifiers or half-rectifiers that convert incoming alternating-current into direct-current, (e) one or more voltage regulators that condition the incoming electrical power to be at a specific voltage, (f) one or more switches that can shut off the supply of electrical power into the unit by manual control, (g) one or more relays that can shut off the supply of electrical power into the unit by remote control, and/or (h) one or more photosensitive devices, heat exchangers, or radiant power collectors conveying other forms of power into the unit and configured so that the power conveyed is converted into electrical power.

Implementations of the power output 104 can include a plurality of standard electrical sockets mounted on the housing 101 of the enhanced PDU. In other implementations, the power output 104 can include one or more plugs mounted on the housing of the enhanced PDU or can include one or more electrical wires or cables capable of conveying electrical power out of the enhanced PDU.

The power output 104 can also include (a) one or more transformers for converting electrical power at an internal voltage to electrical power at an external voltage suitable for supplying electrical power to external devices, (b) one or more surge-suppression circuits that limit the flow of outgoing electrical power, (c) one or more capacitive couplings that prevent any direct-current passing out of the unit, (d) one or more rectifiers or half-rectifiers that convert internal alternating-current into direct-current, (e) one or more voltage regulators that condition the outgoing electrical power to be at a specific voltage, (f) one or more switches that can shut off the electrical power exiting the unit by manual control, (g) one or more relays that can shut off the electrical power exiting the unit by remote control, and/or (h) one or more circuit breakers connected so that they can shut off the electrical power exiting the unit when an overload, ground fault, or arc fault condition is detected.

Typically one of the current sensors 112 can be used to monitor each phase of the power input 102. For instance, if the power input 102 has two separate power input cables coming from two separate power supply circuits, each of the two power supply circuits providing three phases of electrical power, there may be a total of six current sensors used to monitor electrical current from the power input. The information signals 110 from the orientation sensor 114 and the appropriate number of current sensors 112 are received by the microprocessor 108. Other information signals 110, such as from the temperature sensor 116 and the humidity sensor 118, can be received by the microprocessor 108 to be presented on one or more of the displays 120. The microprocessor 108 determines from the information signals 110 received the appropriate numeric and/or alphanumeric values and their proper orientation for presentation on the displays 120, and then transmits the information signals 119 accordingly resulting in the values being displayed in proper orientation on the displays.

Implementations can include the microprocessor 108 being incorporated with a selection of peripheral devices appropriate to performing the functions required of the microprocessor. These peripheral devices can include (a) an analog-to-digital converter for converting external analog signals to a digital form that can be processed by the microprocessor 108, (b) a diagnostic interface to aid software development, (c) a serial interface suitable for supporting RS-232 communications, (d) internal ram suitable for storing measurements and the results of internal computations, and/ or (e) a plurality of input-output pins for communicating with other devices. The microprocessor 108 can be attached to a circuit board along with other electronic devices and connectors appropriate for performing required functions of the microprocessor 108. In other implementations a microcontroller or a simple programmable logic devices (PLDs) can be used instead of the microprocessor 108. In other implementations equivalent circuits can be implemented in a custom chip.

In implementations, typically, there is a plurality of the current sensors 102. Each of the current sensors 102 can have a transformer with a ratio such as one to one thousand. Each transformer can output an alternating current at a voltage suitable to be received by the microprocessor 108. This alternating current can be passed to an RMS-to-DC converter, which produces an analog direct-current voltage, which is passed to the analog-to-digital converter. The RMS-to-DC converters can be considered as part of the current sensors 102 even though they could reside on a circuit board holding the microprocessor 108.

Other implementations rectify each of the alternating currents output by the transformers and run the resulting signals through a high-pass filter to produce an analog direct-current voltage similar to that produced by the RMS-to-DC converters. Other implementations run the power input wires through a magnetic field and measure the electro-motive force produced, which yields the input current through known mathematical formulas.

Implementations of the orientation sensor 114 include a metal ball that rests or fails to rest on a set of four contacts at one end of a plastic tube; the assembly is fabricated as a single unit by a component vendor. Two of the contacts are connected to signal ground, and the other two contacts are connected to each other, to a pull-up circuit, and to an input pin on a microprocessor package. The issue of vibration causing intermittent connections is dealt with by having an integrator circuit between the orientation sensor 114 and the microprocessor 108 with the microprocessor sampling the information signal 110 from the orientation sensor through the integrator circuit and with voting logic (such as two-to-one majority) to determine orientation. Using this approach, if there is no clear winner, the orientation is assumed to be unchanged.

Other implementations of the orientation sensor 114 can include a mercury switch or can use solid-state devices such as inclinometers, accelerometers, or electrolytic tilt sensors. The solid-state devices all produce digital signals, which may be passed on as the information signal 110 from the orientation sensor 114 to the microprocessor 108. Other implementations of the orientation sensor 114 include other mechanical methods.

Figure 2:
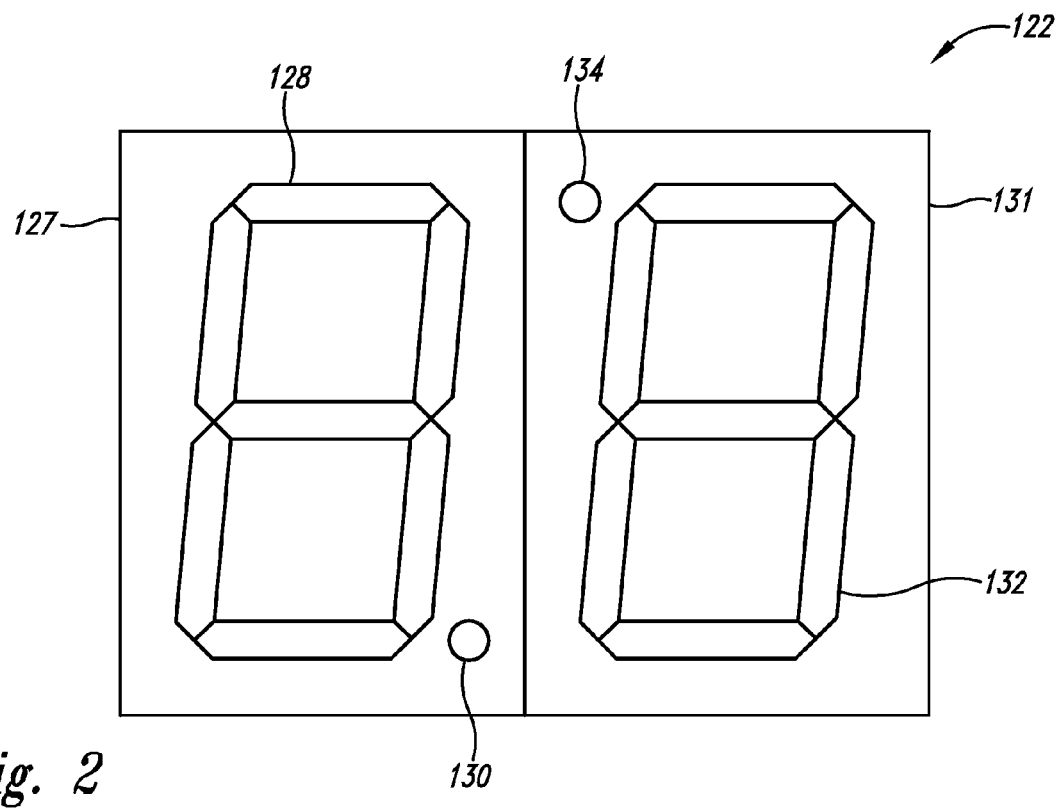
FIG. 2 is a schematic representation of a segmented display used with segmented display implementations of the PDU of FIG. 1.

Implementations of the display 120 use one or more segmented readouts 122, shown in FIG. 2 with two side-by-side segmented readouts, with one segmented readout having an LED unit 127 with a seven-segment LED 128 and a decimal point 130, and the other segmented readout having an LED unit 131 with a seven-segment LED 132 and a decimal point 134. An LED driver chip (not shown) is provided for each of the segmented readouts 122. In some implementations a different one of the segmented readouts 122 can be used for each phase of the power input 102. These can all be mounted on a circuit board separate from the circuit board holding the microprocessor 108. As shown in FIG. 2, the LED unit 127 is installed oriented with the decimal point 130 at the lower right corner of the unit, and the LED unit 131 is installed with an inverted orientation with the decimal point 134 at the upper left corner of the unit.

With the arrangement of the two segmented readouts 122 of FIG. 2 incorporated into the enhanced PDU 100, the display 120 can be driven to visually display information with the proper orientation and decimal point location for reading by a human, i.e., a "right-side-up" orientation with the most significant digit on the left and the decimal point at the base of and between the digits, whether the LED unit 127 is on the left as illustrated in FIG. 2 (a first presentation orientation for the segmented readouts 122), or the display 120 is inverted with the LED unit 131 on the left (a second presentation orientation for the segmented readouts 122). Of course, for the first presentation orientation with the LED unit 127 to the left of the LED unit 131 as illustrated in FIG. 2, defined as having a zero degree orientation, the LED drive chip provides the drive signal for the most significant digit of the information to be displayed to the LED unit 127 and the decimal point 130 is used. But when the display 120 is inverted to the second presentation orientation with the LED unit 131 to the left of the LED unit 127, defined as having a 180-degree orientation, the LED drive chip provides the drive signal for the most significant digit of the information to be displayed to the LED unit 131 and decimal point 134 is used. This is significant when the enhanced PDU 100 can be mounted for use in either the first or second presentation orientation, but yet the display 120 non-movably attached to the housing 101 can still be selectively driven by the microprocessor 108 to display information with the proper orientation and decimal point location for reading.

Figure 3:
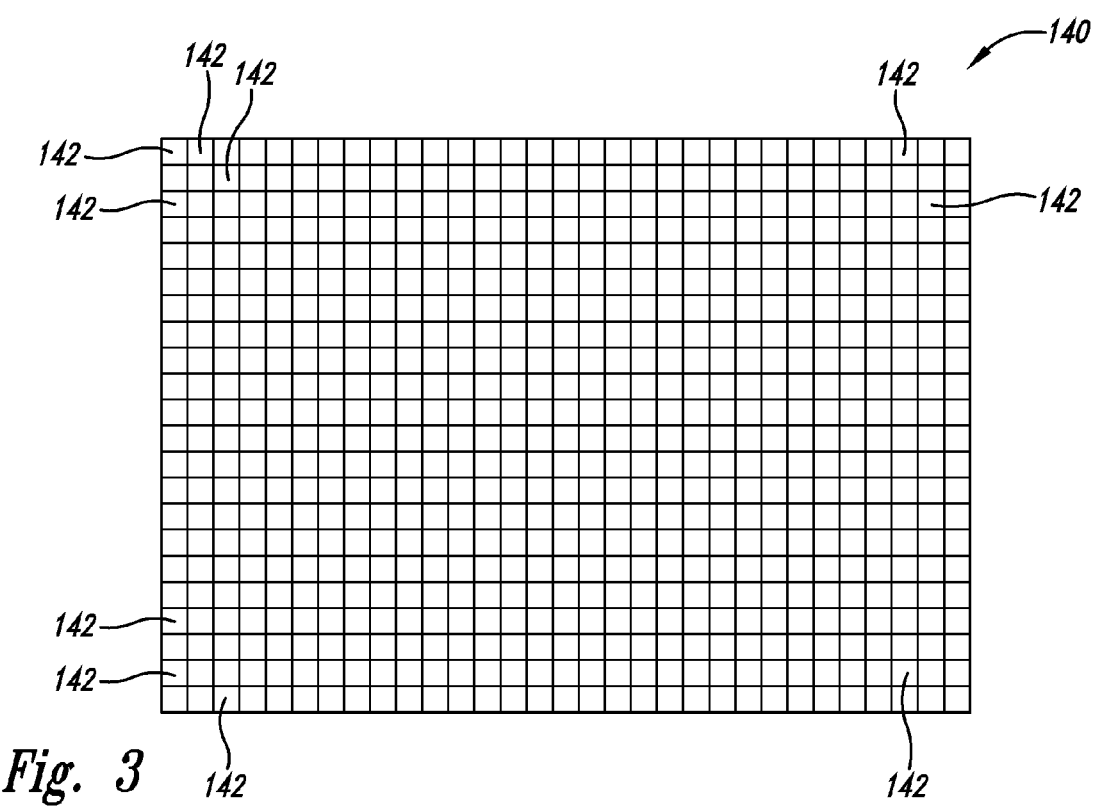
FIG. 3 is a schematic representation of a matrix display used with matrix display implementations of the PDU of FIG. 1.

As shown in FIG. 3, alternative implementations of the display 120 use one or more matrix readouts 140 either of a dot-matrix LED type or graphic LCD type in which each pixel 142 in the matrix readout 140 can be turned on or off independently. When incorporated into the enhanced PDU 100 and non-movably attached to the housing 101, the matrix readout 140 can display information in or close to a right-side-up manner by using a selected one of at least four different matrix presentation orientations selected depending upon the orientation of the enhanced PDU.

A first version of the enhanced PDU 100 is depicted in FIGS. 4-7 with an illustrative gravity (G) vector 143 with its arrow head pointing in the direction that an object would fall under the influence of the earth's gravity field. The power input 102 is a single power input cable and the power output 104 includes a plurality of receptacles that each supply the same phase power so that the single display 120 is sufficient to display information about electrical current for the single phase of power being supplied. When using the matrix readout 140 of FIG. 3, FIGS. 4-7 depict four different matrix presentation orientations for the matrix readout 140. These include a first matrix presentation orientation (FIG. 4) having a zero degree orientation, a second matrix presentation orientation (FIG. 5) having a 90 degree orientation and being perpendicular to the first matrix presentation orientation, a third matrix presentation orientation (FIG. 6) having a 180 degree orientation and being inverted relative to the first matrix presentation orientation, and a fourth matrix presentation orientation (FIG. 7) having a 270 degree orientation and being inverted relative to the second matrix presentation orientation. Further types of matrix presentation orientations for the matrix readout 140 can include diagonally presented information that is less than perpendicular to one of the above-described matrix presentation orientations for the matrix readout.

For the case where the display 120 is the two segmented readouts 122 of FIG. 2, either the display can be non-movably attached to the housing 101 as shown in FIGS. 4 and 6 which depict the first version of the enhanced PDU 100 in the first presentation orientation and the second presentation orientation, respectively, or the display can be non-movably attached to the housing as shown in FIGS. 5 and 7 which depict the first version of the enhanced PDU in the first presentation orientation and the second presentation orientation, respectively.

A second version of the enhanced PDU 100 is depicted in FIGS. 8-11 with the power input 102 including a first power input cable 154*a* supplying first electrical power having a first phase, a second phase, and a third phase from a first power circuit (not shown) and a second power input cable 154*b* supplying second electrical power having a first phase, a second phase, and a third phase from a second power circuit (not shown). The display 120 includes a readout 156*a*1, a readout 156*a*2, a readout 156*a*3, a readout 156*b*1, a readout 156*b*2 and a readout 156*b*3. The readout 156*a*1 displays electrical current levels for the first phase of the electrical power from the first power input cable 154*a*. The readout 156*a*2 displays electrical current levels for the second phase of the electrical power from the first power input cable 154*a*. The readout 156*a*3 displays electrical current levels for the third phase of the electrical power from the first power input cable 154*a*. The readout 156*b*1 displays electrical current levels for the first phase of the electrical power from the second power input cable 154*b*. The readout 156*b*2 displays electrical current levels for the second phase of the electrical power from the second power input cable 154*b*. The readout 156*b*3 displays electrical current levels for the third phase of the electrical power from the second power input cable 154*b*.

The power output 104 of the second version of the enhanced PDU 100 includes receptacles 158*a*1, receptacles 158*a*2, receptacles 158*a*3, receptacles 158*b*1, receptacles 158*b*2, and receptacles 158*b*3. The receptacles 158*a*1 furnishes first phase power from the first power input cable 154*a*. The receptacles 158*a*2 furnishes second phase power from the first power input cable 154*a*. The receptacles 158*a*3 furnishes third phase power from the first power input cable 154*a*. The receptacles 158*b*1 furnishes first phase power from the second power input cable 154*b*. The receptacles 158*b*2 furnishes second phase power from the second power input cable 154*b*. The receptacles 158*b*3 furnishes third phase power from the second power input cable 154*b*.

For the case where the display 120 of the second version of the enhanced PDU 100 uses the matrix readouts 140 of FIG. 3, FIGS. 8-11 depict the four different matrix presentation orientations for the matrix readouts, i.e., the first matrix presentation orientation (FIG. 8), the second matrix presentation orientation (FIG. 9), the third matrix presentation orientation (FIG. 10) and the fourth matrix presentation orientation (FIG. 11), much as shown and described above for FIGS. 4-7 of the first 4version of the enhanced PDU.

Figure 8:
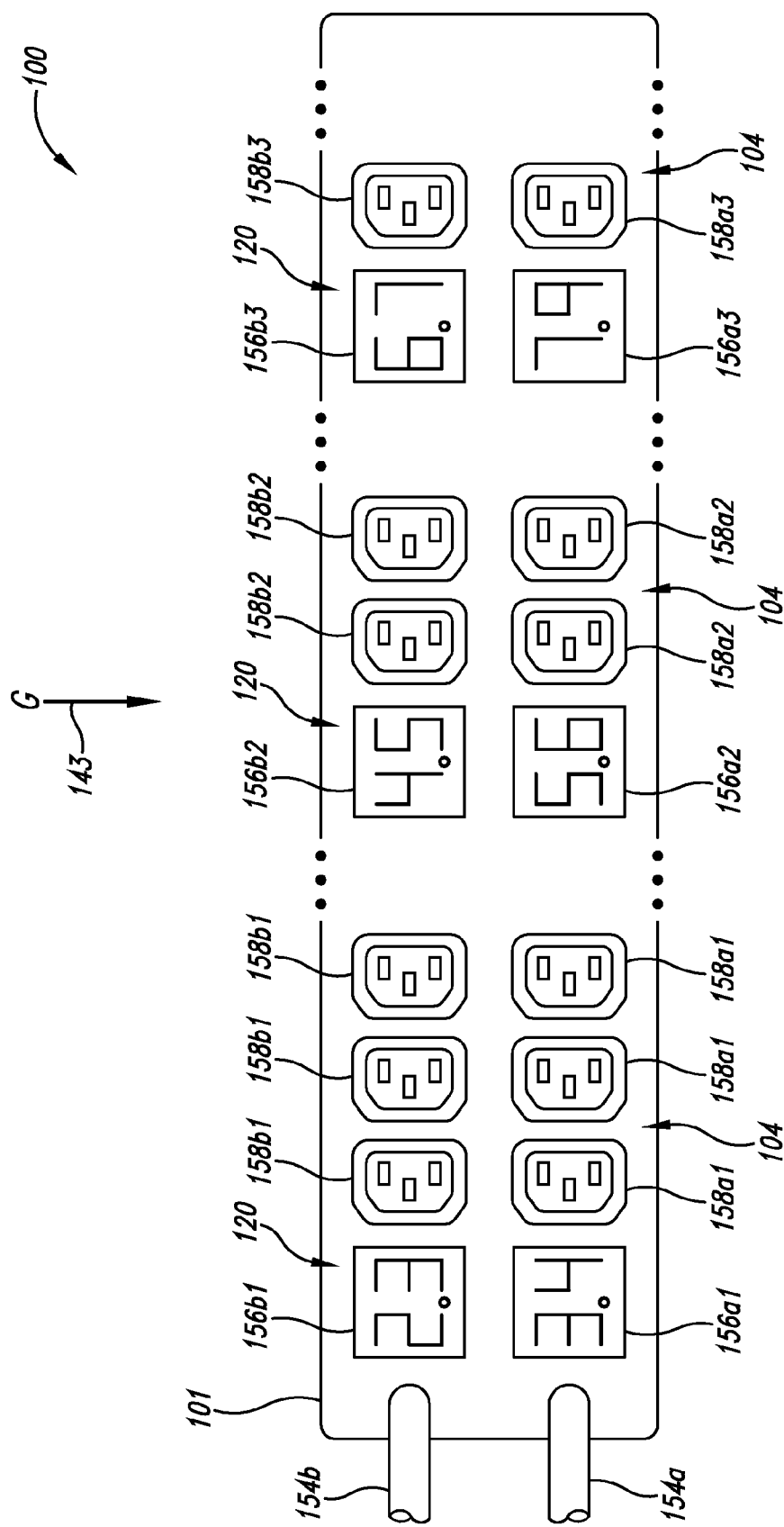
FIG. 8 is a schematic depiction of a second version of the PDU of FIG. 1 shown using a first presentation orientation.
Figure 9:
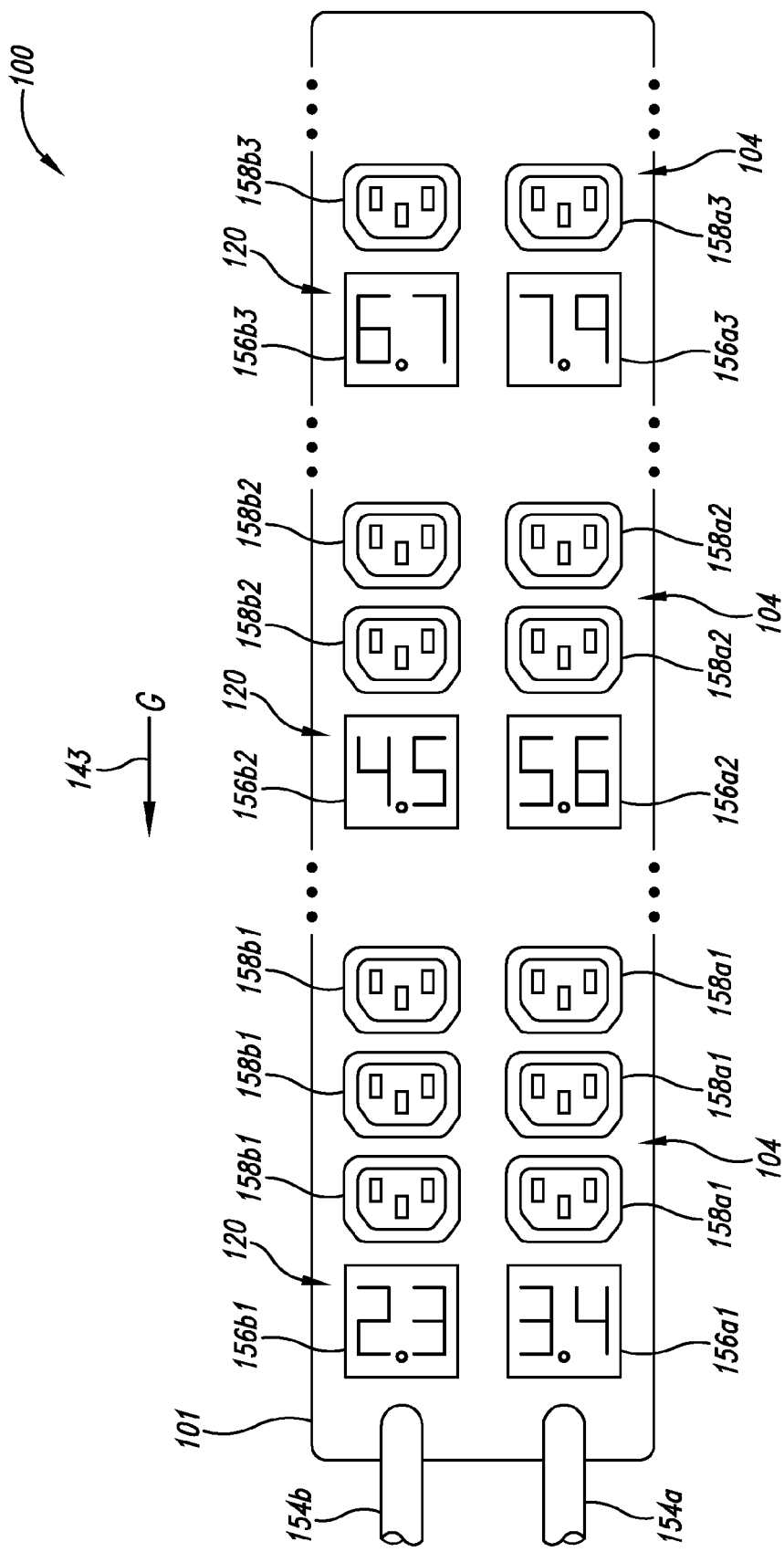
FIG. 9 is a schematic depiction of a second version of the PDU of FIG. 1 shown using a second presentation orientation.
Figure 10:
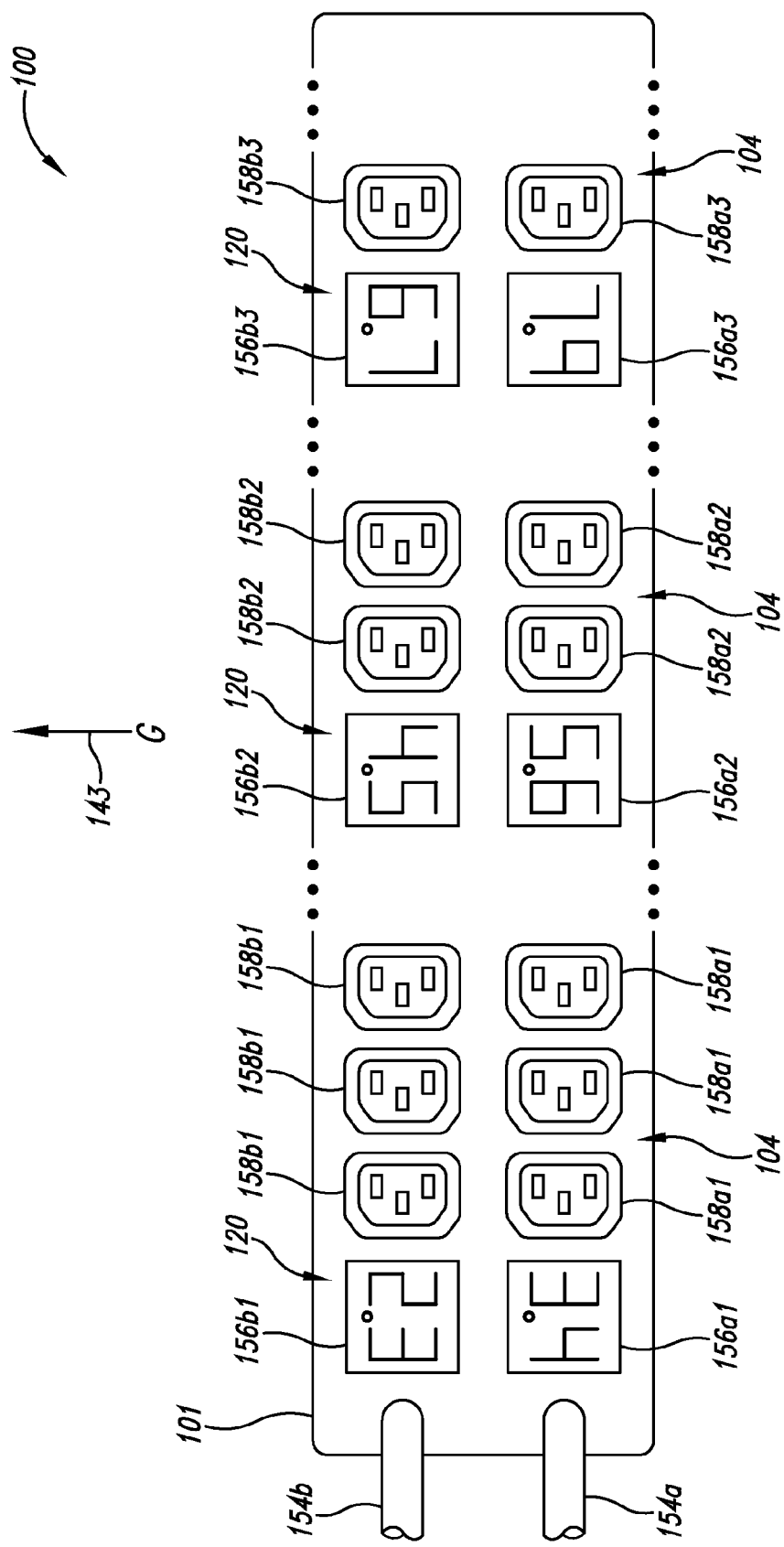
FIG. 10 is a schematic depiction of a second version of the PDU of FIG. 1 shown using a third presentation orientation.
Figure 11:
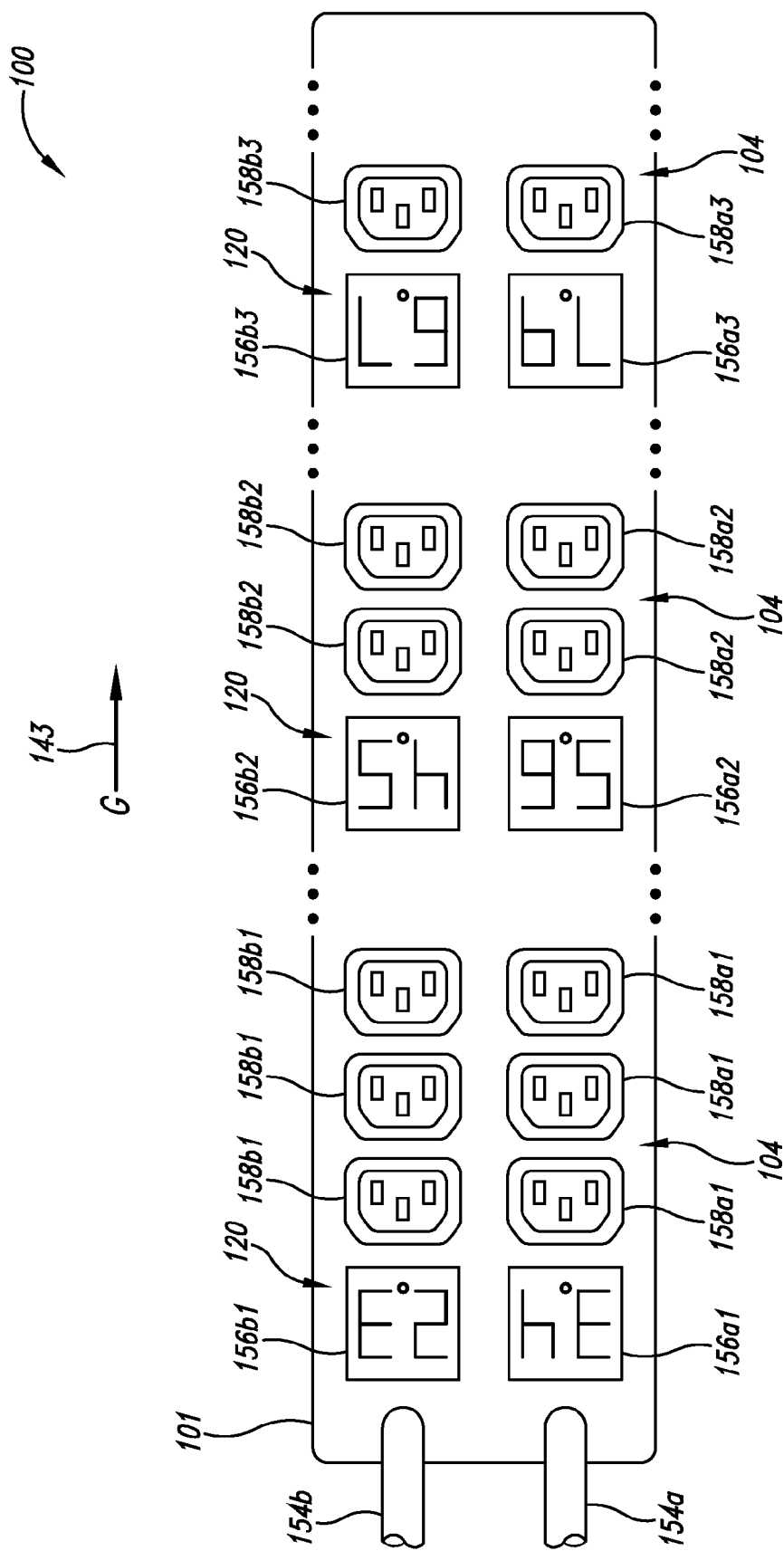
FIG. 11 is a schematic depiction of a second version of the PDU of FIG. 1 shown using a fourth presentation orientation.

As above for the first version of the enhanced PDU 100, for the case of the second version of the enhanced PDU where the display 120 is the two segmented readouts 122 of FIG. 2, either the display can be non-movably attached to the housing 101 as shown in FIGS. 8 and 10 which depict the second version of the enhanced PDU 100 in the first presentation orientation and the second presentation orientation, respectively, or the display can be non-movably attached to the housing as shown in FIGS. 9 and 11 which depict the second version of the enhanced PDU in the first presentation orientation and the second presentation orientation, respectively.

A third version of the enhanced PDU 100 is depicted in FIGS. 12-15 which is similar in many respects to the second version described above. For the case where the display 120 of the third version uses the matrix readouts 140 of FIG. 3, FIGS. 12-15 depict the four different matrix presentation orientations for the matrix readouts, i.e., the first matrix presentation orientation (FIG. 12), the second matrix presentation orientation (FIG. 13), the third matrix presentation orientation (FIG. 14) and the fourth matrix presentation orientation (FIG. 15), much as shown and described above for FIGS. 4-7 of the first version of the enhanced PDU.

Figure 12:
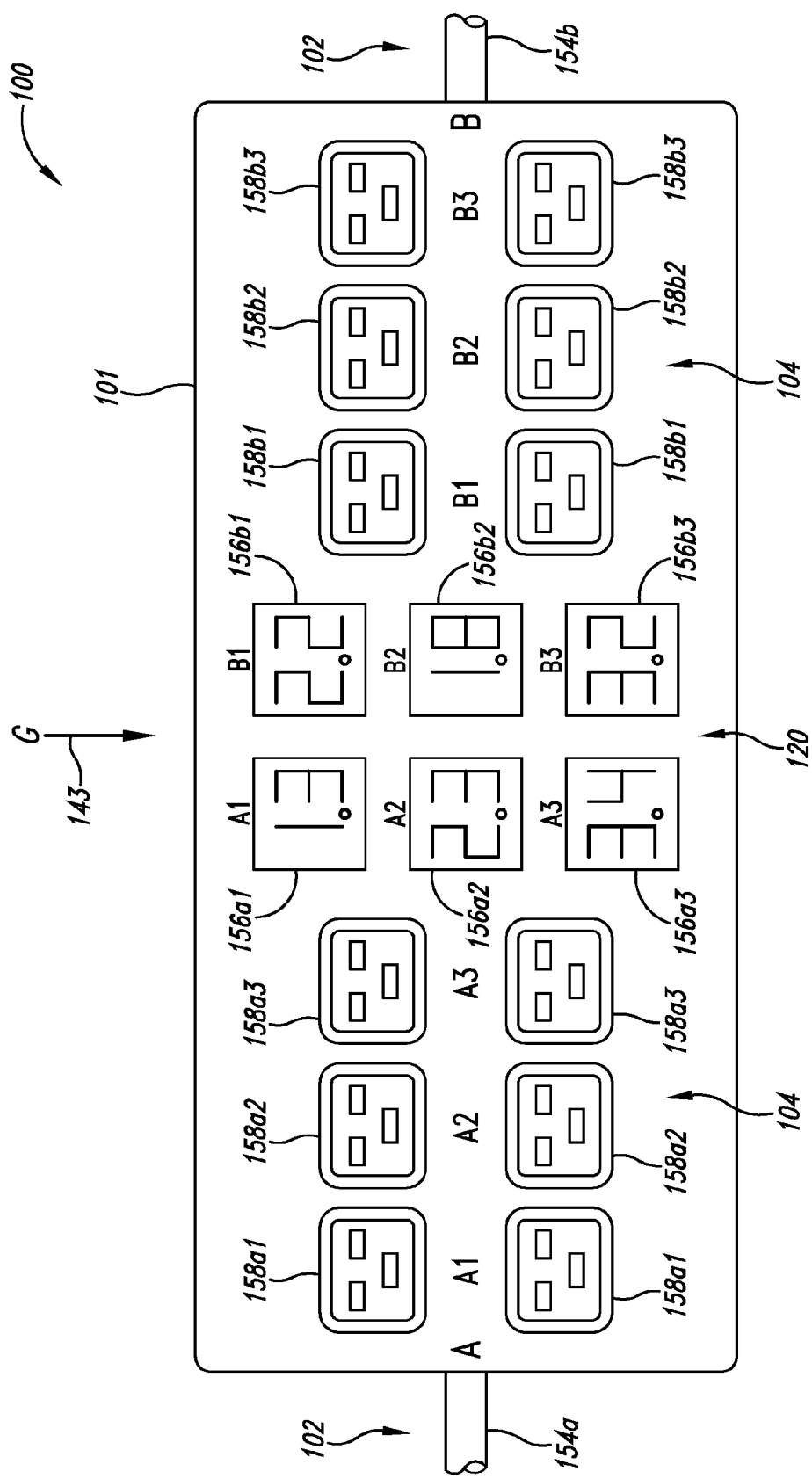
FIG. 12 is a schematic depiction of a third version of the PDU of FIG. 1 shown using a first presentation orientation.
Figure 13:
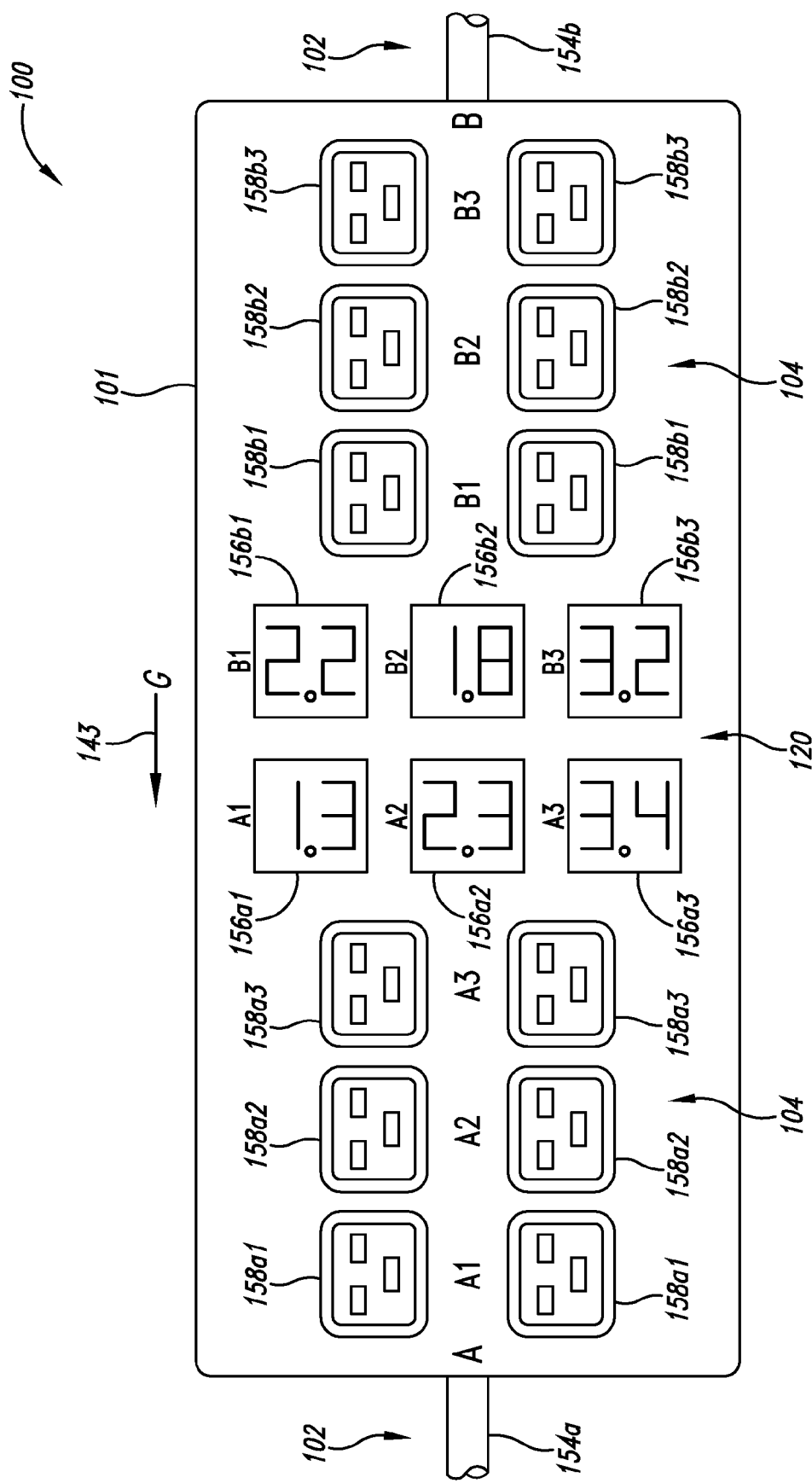
FIG. 13 is a schematic depiction of a third implementation of the PDU of FIG. 1 shown using a second presentation orientation.
Figure 14:
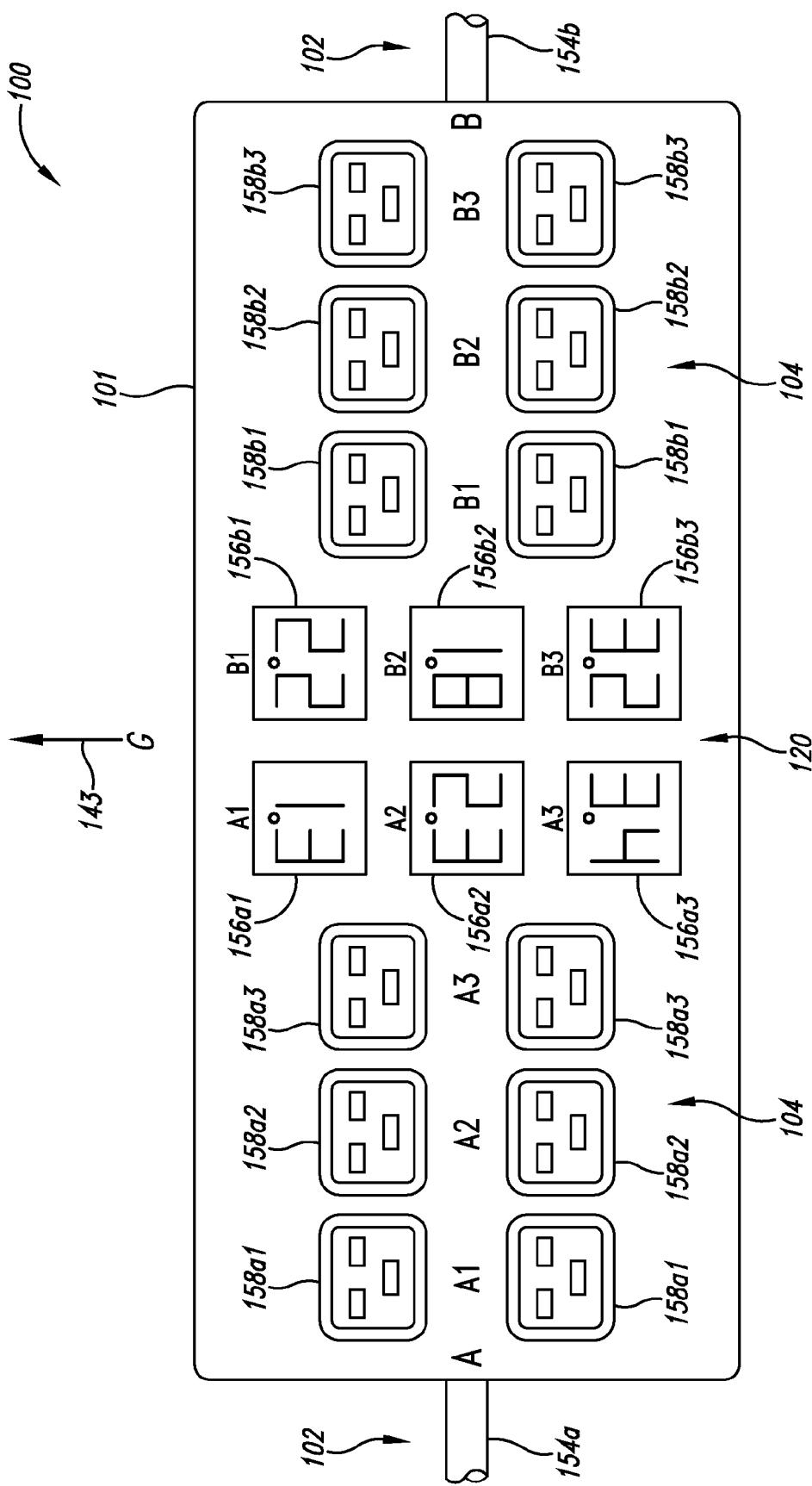
FIG. 14 is a schematic depiction of a third version of the PDU of FIG. 1 shown using a third presentation orientation.
Figure 15:
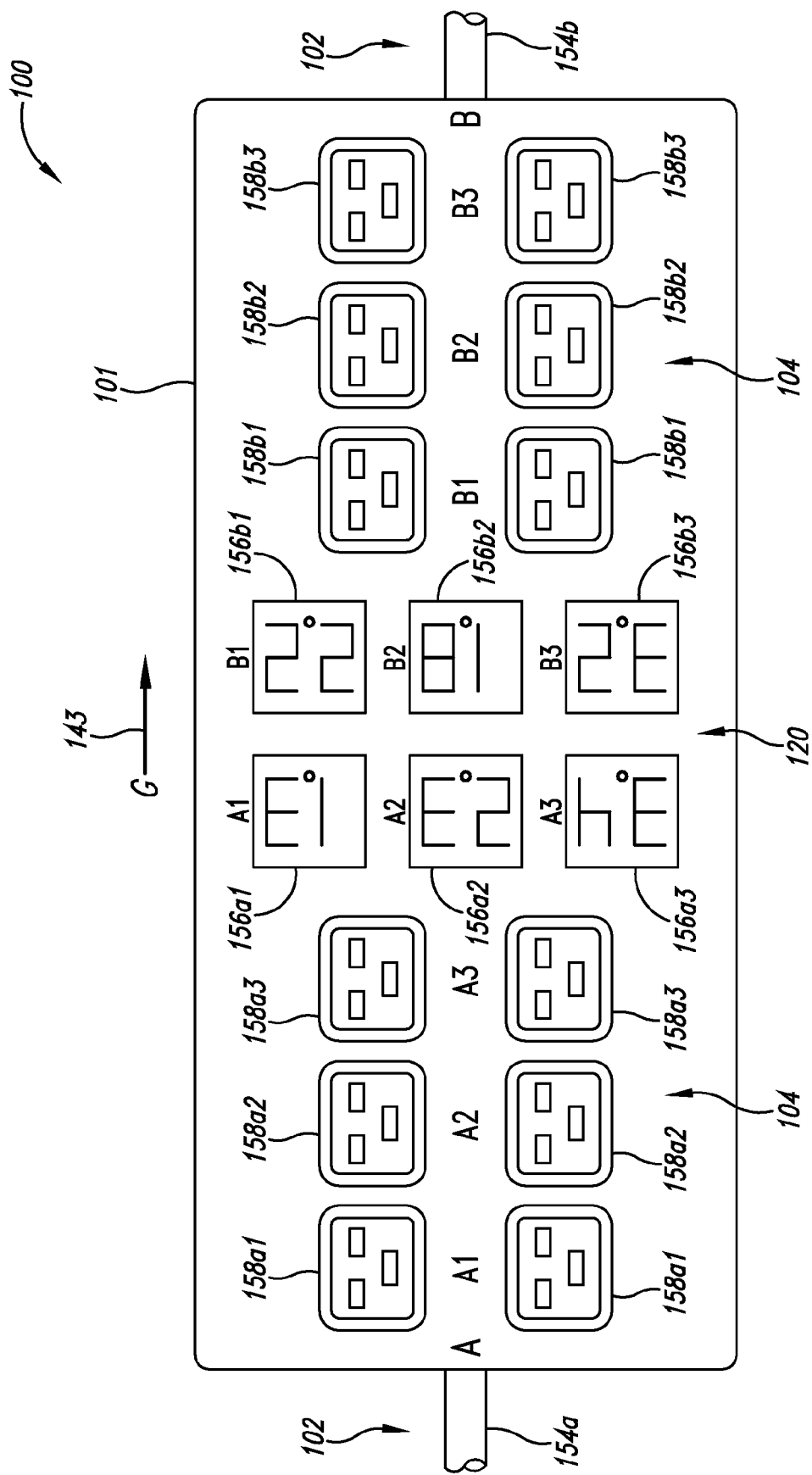
FIG. 15 is a schematic depiction of a third version of the PDU of FIG. 1 shown using a fourth presentation orientation.
Figure 16:
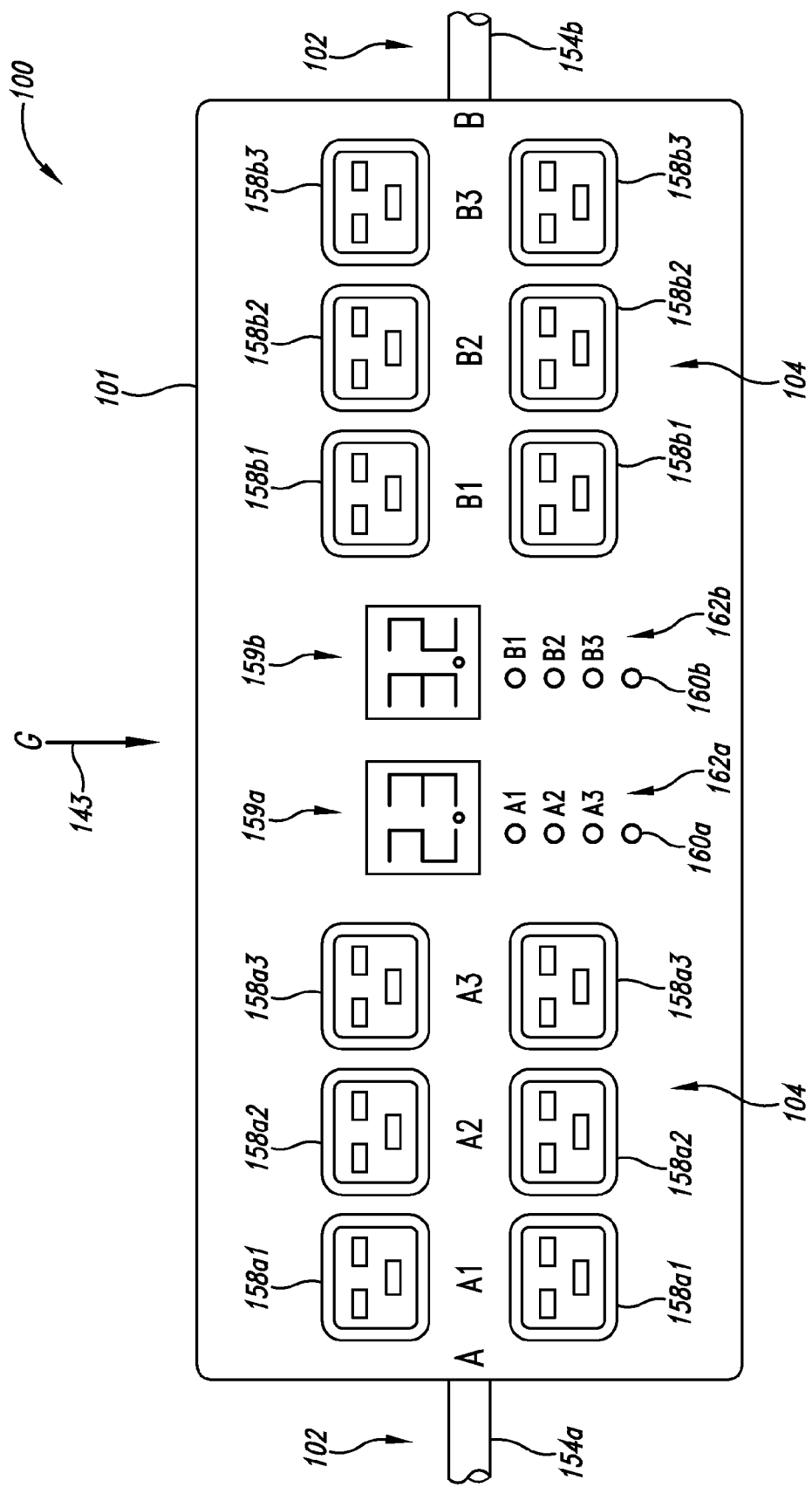
FIG. 16 is a schematic depiction of a fourth version of the PDU of FIG. 1 shown using a first presentation orientation.

As above for the second version of the enhanced PDU 100, for the case of the third version of the enhanced PDU where the display 120 is the two segmented readouts 122 of FIG. 2, either the display can be non-movably attached to the housing 101 as shown in FIGS. 12 and 14 which depict the third version of the enhanced PDU 100 in the first presentation orientation and the second presentation orientation, respectively, or the display can be non-movably attached to the housing 101 as shown in FIGS. 13 and 15 which depict the third version of the enhanced PDU in the first presentation orientation and the second presentation orientation, respectively. A fourth version of the enhanced PDU 100 is depicted in FIG. 16 as having the power input 102 and the power output 104 of the third version of the enhanced PDU depicted in FIGS. 12-15. The display 120 of the fourth version has a readout 159*a* and a readout 159*b*. The readout 159*a* displays electrical current levels for the first phase, the second phase, or the third phase of the electrical power from the first power input cable 154*a* depending upon the setting of a selector switch 160*a*. The readout 159*b* displays electrical current levels for the first phase, the second phase, or the third phase of the electrical power from the second power input cable 154*b* depending upon the setting of a selector switch 160*b*.

The current setting of the selector switch 160*a* is indicated by status lights 162*a*. If the selector switch 160*a* has been set for the readout 159*a* to display electrical current levels for the first phase of the electrical power from the first power cable 154*a*, the "A1" status light 162*a* will be lit. If the selector switch 160*a* has been set for the readout 159*a* to display electrical current levels for the second phase of the electrical power from the first power cable 154*a*, the "A2" status light 162*a* will be lit. If the selector switch 160*a* has been set for the readout 159*a* to display electrical current levels for the third phase of the electrical power from the first power cable 154*a*, the "A3" status light 162*a* will be lit.

Similarly the current setting of the selector switch 160*b* is indicated by status lights 162*b*. If the selector switch 160*b* has been set for the readout 159*b* to display electrical current levels for the first phase of the electrical power from the first power cable 154*b*, the "B1" status light 162*b* will be lit. If the selector switch 160*b* has been set for the readout 159*b* to display electrical current levels for the second phase of the electrical power from the first power cable 154*b*, the "B2"

status light 162*b* will be lit. If the selector switch 160*b* has been set for the readout 159*b* to display electrical current levels for the third phase of the electrical power from the first power cable 154*b*, the "B3" status light 162*b* will be lit.

Figure 17:
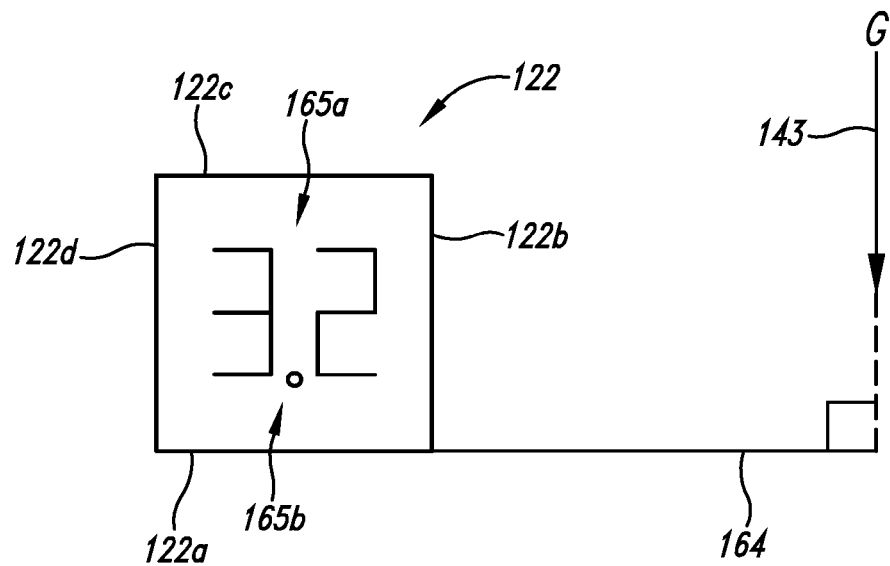
FIG. 17 is a schematic depiction of a segmented readout in a first position using a first presentation orientation.

Operation of the two segmented readouts 122 of FIG. 2 by the microprocessor 108 based on the input of the orientation sensor 114 is described with reference to FIGS. 17-20 showing the enhanced PDU 100 mounted for use in a number of different physical installation orientations resulting the two segmented readouts 122 being in a variety of angular positions. To facilitate the description, the segmented readout 122 is shown as having a first side 122*a* (the bottom side in FIG. 17), a second side 122*b* (the right side in FIG. 17), a third side 122*c* (the top side in FIG. 17), and a fourth side 122*d* (the left side in FIG. 17). In FIG. 17 the first side 122*a* (bottom side) is on an illustrative horizon line 164 perpendicular to the illustrative gravity (G) vector 143 depicting the first presentation orientation previously described for the two segmented readouts 122 of FIG. 2. When the two segmented readouts 122 are driven to display information it results in a right-side-up display with the proper orientation and decimal point location for reading by a human, i.e., with the most significant digit on the left and the decimal point at the base of and between the digits. When the two segmented readouts 122 is in this first angular position using the first presentation orientation, an upside portion 165*a* of the displayed information is adjacent to the third side 122*c* (top side) and a downside portion 165*b* of the displayed information is adjacent to the first side 122*a* (bottom side).

Figure 18:
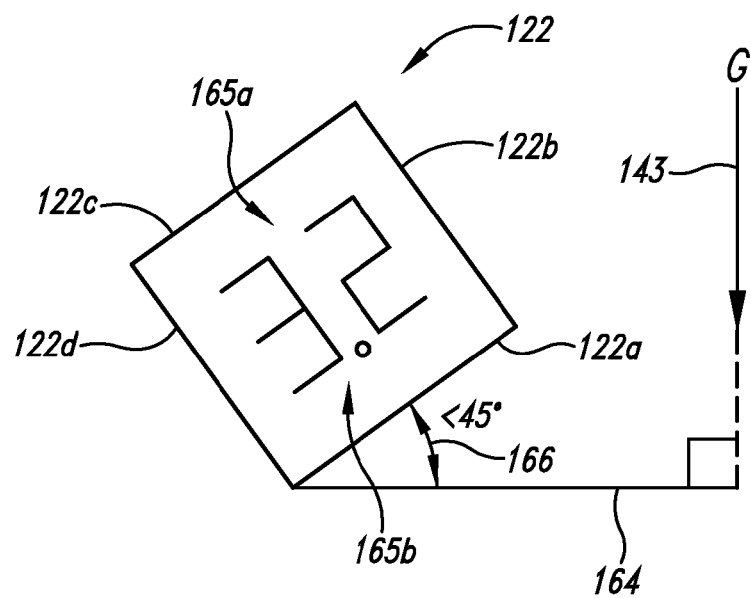
FIG. 18 is a schematic depiction of a segmented readout of FIG. 17 in a second position tilted to the left using the first presentation orientation.

In FIG. 18 the enhanced PDU 100 is mounted for use with a physical orientation such that the two segmented readouts 122 is in a second angular position tilted to the left at a tilt angle 166 between the first side 122*a* (bottom side) and the horizon line 164 of less than 45 degrees, and driving the two segmented readouts 122 using the first presentation orientation displays the information as close to the desirable right-side-up display as possible.

Figure 19:
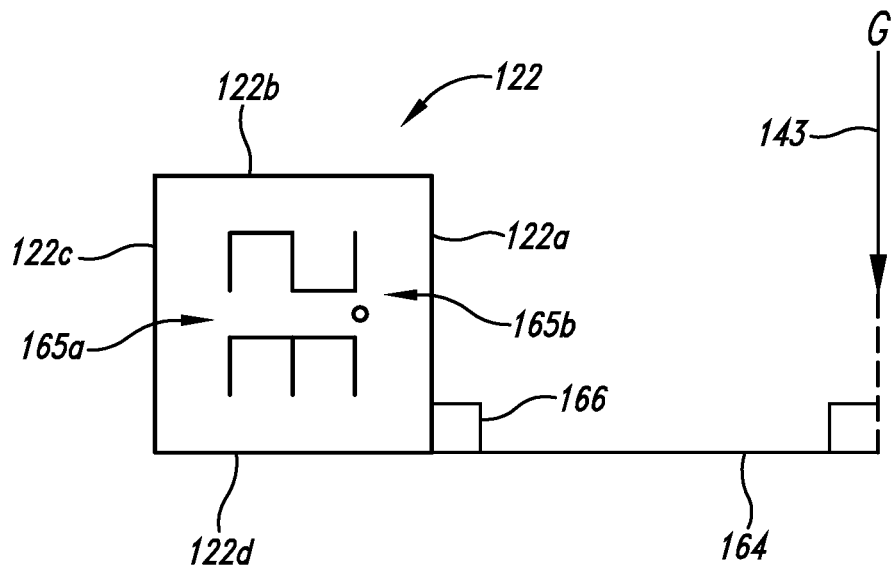
FIG. 19 is a schematic depiction of the segmented readout of FIG. 17 in a third position tilted further to the left using the first presentation orientation.

In FIG. 19 the enhanced PDU 100 is mounted for use with a physical orientation such that the two segmented readouts 122 is in a third angular position tilted further to the left at the tilt angle 166 of 90 degrees. In this angular position the fourth side 122*d* is now in a bottom side position, thus the first presentation orientation shown in FIG. 19 as well as the inverted second presentation orientation are equally close to being at the desirable right-side-up display so neither provides a significant benefit over the other and the microprocessor 108 can select either one depending on its programming.

Figure 20:
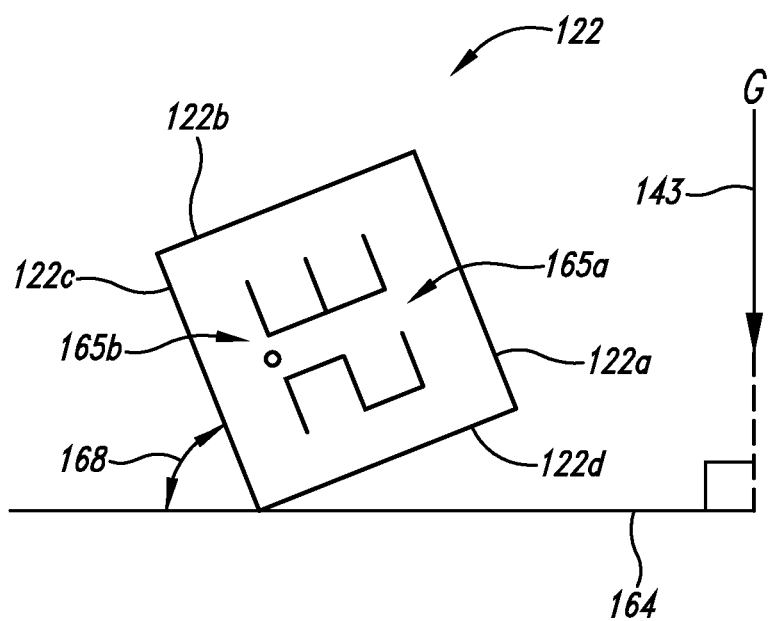
FIG. 20 is a schematic depiction of the segmented readout of FIG. 17 in a fourth position tilted to the right using a second presentation orientation.

In FIG. 20 the enhanced PDU 100 is mounted for use with a physical orientation such that the two segmented readouts 122 is in a fourth angular position with the fourth side 122*d* still in a bottom side position but with the two segmented readouts tilted even further to the left to a tilt angle 168 between the third side 122*c* and the illustrative horizon line 164 of less than 90 degrees. With the two segmented readouts 122 in this fourth angular position, the first presentation orientation would result in the information being displayed somewhat up-side-down so the microprocessor 108 determines that the second presentation orientation will display the information closer to the desirable right-side-up display and provides the information signal 119 to the two segmented readout to produce the second presentation orientation. This displays the information more closely to the desirable right-side-up display as is shown in FIG. 20, with the upside portion 165*a* of the displayed information adjacent to the first side 122*a* of the two segmented readouts. It is noted that this display is inverted with respect to the display arrangement shown in FIGS. 17-18 where the upside portion 165*a* was adjacent to the third side 122*c*. As such, based upon the sensed physical orientation of the mounted enhanced PDU 100, the enhanced PDU self adjusts the orientation of the information displayed on its two segmented readouts 122 to produce a display orientation closer to the desirable right-side-up display than might otherwise occur.

Figure 21:
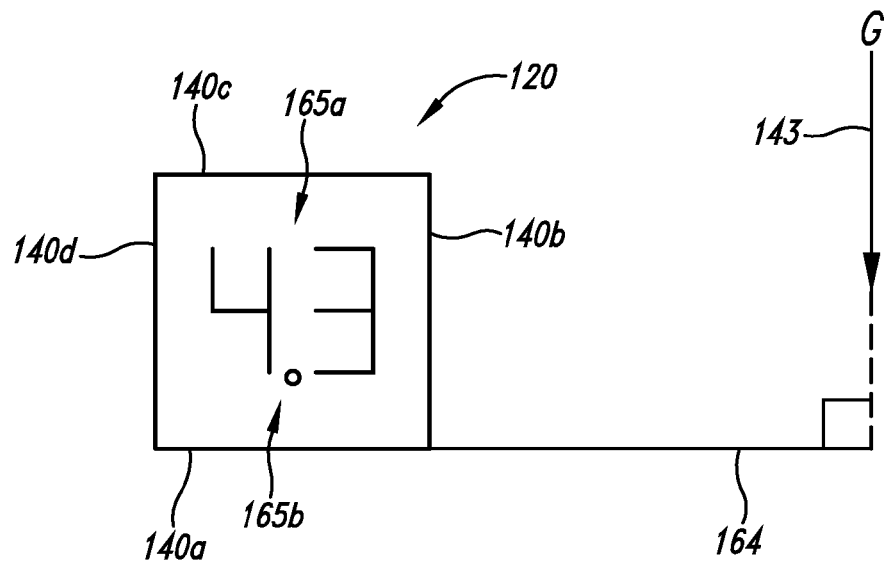
FIG. 21 is a schematic depiction of a matrix readout in a first position using a first presentation orientation.

Operation of the matrix readout 140 of FIG. 3 by the microprocessor 108 based on the input of the orientation sensor 114 is now described with reference to FIGS. 21-25 showing the enhanced PDU 100 mounted for use in a number of different physical installation orientations resulting the matrix readout 140 being in a variety of angular positions. As above, to facilitate the description, the matrix readout 140 is shown as having a first side 140*a* (the bottom side in FIG. 21), a second side 140*b* (the right side in FIG. 21), a third side 140*c* (the top side in FIG. 21), and a fourth side 140*d* (the left side in FIG. 21). In FIG. 21 the first side 140*a* (bottom side) is on the illustrative horizon line 164 perpendicular to the illustrative gravity (G) vector 143 depicting the first matrix presentation orientation previously described for the matrix readout 140 of FIG. 3. When the matrix readout 140 is driven to display information it results in a right-side-up display with the proper orientation and decimal point location for reading by a human. When the matrix readout 140 is in this first angular position using the first presentation orientation, an upside portion 165*a* of the displayed information is adjacent to the third side 140*c* (top side) and a downside portion 165*b* of the displayed information is adjacent to the first side 140*a* (bottom side).

Figure 22:
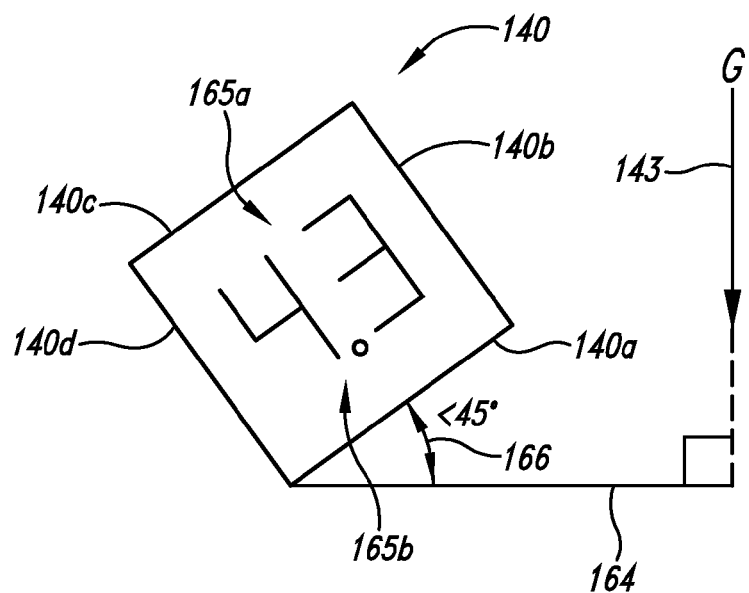
FIG. 22 is a schematic depiction of the matrix readout of FIG. 21 in a second position tilted to the left by less than 45 degrees using the first presentation orientation.

In FIG. 22 the enhanced PDU 100 is mounted for use with a physical orientation such that the matrix readout 140 is in a second angular position tilted to the left at a tilt angle 166 between the first side 140*a* (bottom side) and the horizon line 164 of less than 45 degrees, and driving the matrix readout 140 using the first matrix presentation orientation displays the information as close to the desirable a right-side-up display as possible.

Figure 23:
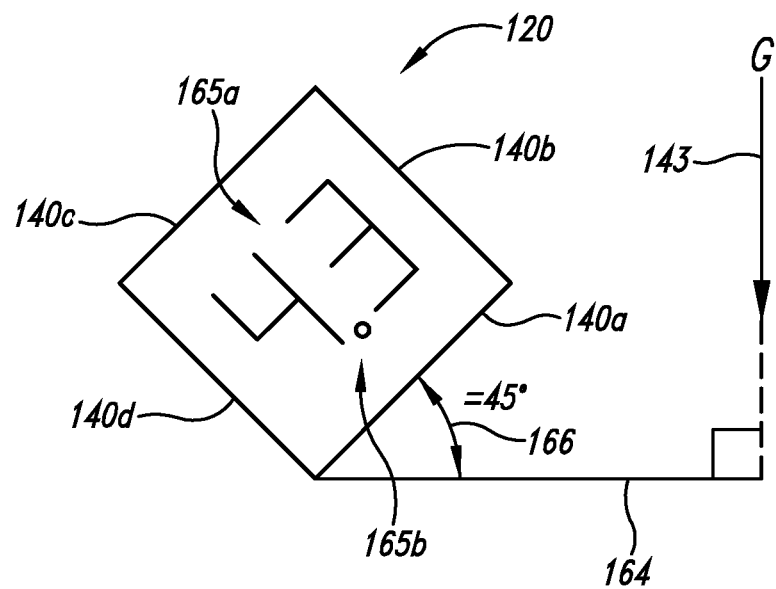
FIG. 23 is a schematic depiction of the matrix readout of FIG. 21 in a third position tilted to the left by 45 degrees using the first presentation orientation.

In FIG. 23 the enhanced PDU 100 is mounted for use with a physical orientation such that the matrix readout 140 is in a third angular position tilted further to the left at the tilt angle 166 of 45 degrees. In this angular position the first matrix presentation orientation and the second matrix presentation orientation are equally close to being at the desirable right-side-up display so neither provides a significant benefit over the other and the microprocessor 108 can select either one depending on its programming. The first matrix presentation orientation is depicted in FIG. 23.

Figure 24:
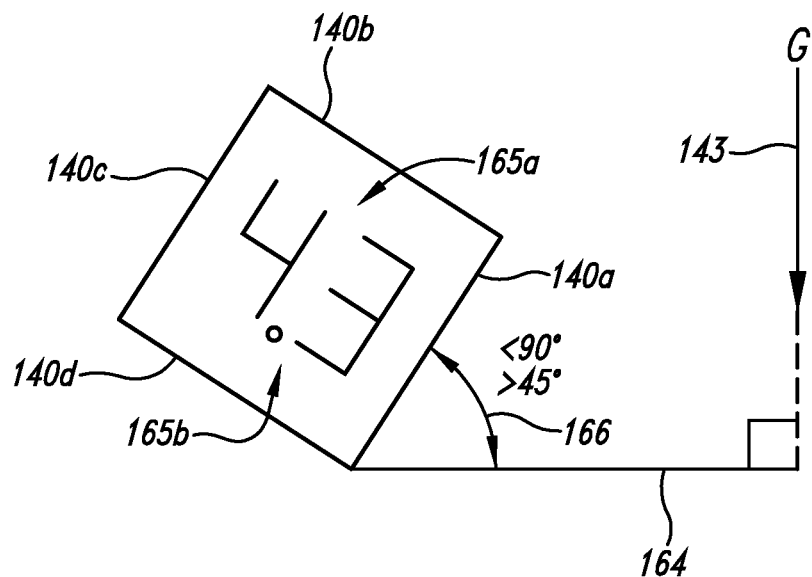
FIG. 24 is a schematic depiction of the matrix readout of FIG. 21 in the third position tilted to the left by greater than 45 degrees but less than 90 degrees using a second presentation orientation.

In FIG. 24 the enhanced PDU 100 is mounted for use with a physical orientation such that the matrix readout 140 is in a fourth angular position tilted further to the left at the tilt angle 166 of greater than 45 degrees but less than 90 degrees. In this angular position the fourth side 140*d* is now closer to a bottom side position than the first side 140*a*. With the matrix readout 140 in this fourth angular position, the first matrix presentation orientation would result in the information being displayed less close to the desirable right-side-up display than when in the second matrix presentation orientation so the microprocessor 108 determines that the second matrix presentation orientation will display the information closer to the desirable right-side-up display and provides the information signal 119 to the matrix readout to produce the second matrix presentation orientation. This displays the information more closely to the desirable right-side-up display as is shown in FIG. 24, with the upside portion 165*a* of the displayed information adjacent to the second side 140*b* of the matrix readout. It is noted that this display is rotated to the right 90 degrees with respect to the display arrangement shown in FIGS. 21-23 where the upside portion 165a was adjacent to the third side 140c.

Figure 25:
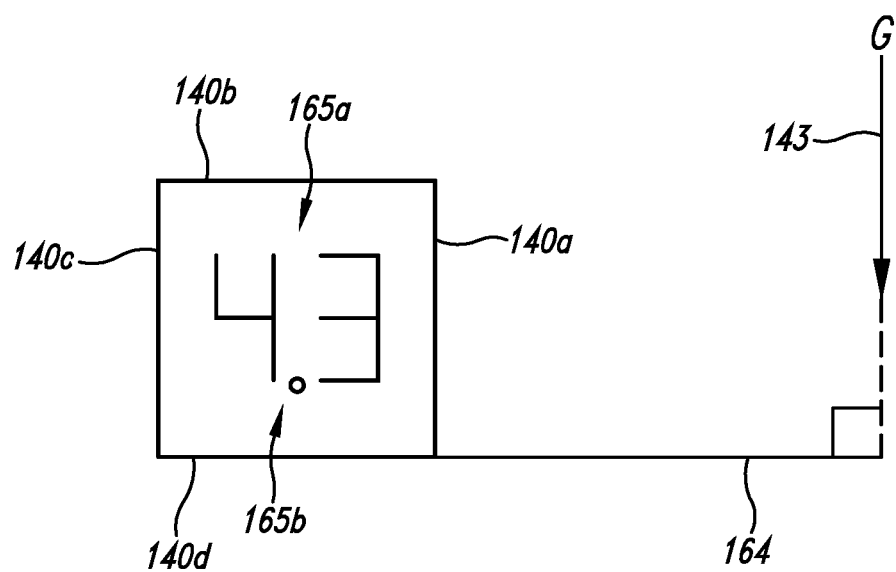
FIG. 25 is a schematic depiction of the matrix readout of FIG. 21 in a fourth position tilted to the left by 90 degrees using the second presentation orientation.

In FIG. 25, the enhanced PDU 100 is mounted for use with a physical orientation such that the matrix readout 140 is in a fifth angular position tilted further to the left at the tilt angle 166 between the first side 140a and the illustrative horizon line 164 is 90 degrees. In this angular position the fourth side 140d is now in a bottom side position with the second matrix presentation orientation being the right-side-up display. As described above for two segmented readouts 122, based upon the sensed physical orientation of the mounted enhanced PDU 100, the enhanced PDU self adjusts the orientation of the information displayed on its matrix readout 140 to produce a display orientation closer to the desirable right-side-up display than might otherwise occur.

Accordingly, while the present invention has been described herein in detail in relation to several implementations, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The invention claimed is:

1. A system to provide electrical power to at least one external device, the system comprising:
    a housing configured to have a selected installation orientation chosen from a plurality of possible installation orientations;
    a power input coupled to the housing and couplable to receive electrical power;
    at least one power output coupled to the housing and coupled to receive electrical power from the power input, the at least one power output being configured to supply power to the at least one external device;
    a display non-movably attached to the housing and configured to visually display information in four presentation orientations relative to the housing, each corresponding to at least one of the plurality of possible installation orientations of the housing;
    an orientation sensor coupled to the housing, at any one time the orientation sensor configured to exist in a particular one of a plurality of states corresponding to the selected installation orientation of the housing;
    a second sensor coupled to the housing, at any one time the second sensor configured to exist in a particular one of a plurality of states based upon a sensed condition associated with the system; and
    a microprocessor coupled to the housing, the microprocessor communicatively linked to the orientation sensor to receive input from the orientation sensor based upon the particular state of the orientation sensor, the microprocessor communicatively linked to the second sensor to receive input from the second sensor based upon the particular state of the second sensor, the microprocessor configured to select one of the four presentation orientations for the display based upon the input received from the orientation sensor and to send output to the display to visually display information based upon the input received from the second sensor in the selected one of the four presentation orientations.

2. The system of claim 1 wherein the at least one power output includes a plurality of receptacles.

3. The system of claim 1 wherein the power input has at least one power input cable.

4. The system of claim 3 wherein the at least one power output includes at least one receptacle for each of the at least one power input cables of the power input.

5. The system of claim 3 wherein for each of the at least one power input cables of the power input, the at least one power output includes at least one receptacle for each phase of power on each of at least one power input cable.

6. The system of claim 1 wherein the second sensor is at least one current sensor.

7. The system of claim 1 wherein the display includes at least one matrix readout.

8. The system of claim 7 wherein the matrix readout is one of the following: dot-matrix LED and graphic LCD.

9. The system of claim 1 wherein the display includes at least one segmented readout.

10. The system of claim 1 wherein the display includes two segmented readouts, and the two segmented readouts have a first LED unit with a first seven segment display and a first decimal point, and second LED unit with a second seven segment display and a second decimal point, the second LED unit being inverted relative to the first LED unit such that when the first LED unit is positioned upright the first decimal point is positioned in the lower right of the first seven segment display, and the second decimal point is positioned in the upper left of the second seven segment display.

11. The system of claim 10 wherein the first LED unit is non-movably attached to the housing in a first orientation and the second LED unit is non-movably attached to the housing in a second orientation, the second orientation being inverted relative to the first orientation.

12. The system of claim 1 wherein the second sensor includes one of the following: current sensor, humidity sensor, and temperature sensor.

13. The system of claim 1 wherein the display is configured to display one of the following: numeric and alphanumeric symbols.

14. The system of claim 1, wherein the four presentation orientations comprise a first presentation orientation, a second presentation orientation, a third presentation orientation, and a fourth presentation orientation, the second presentation orientation being inverted relative to the first presentation orientation, and the first presentation orientation being substantially orthogonal to the third presentation orientation.

15. A system to provide electrical power to one or more external devices, the system comprising:
    a housing mountable with a selected installation orientation;
    at least one power input cable coupled to the housing and couplable to receive electrical power;
    a plurality of receptacles coupled to the housing and coupled to receive electrical power from the at least one power input cable, the plurality of receptacles being configured to provide power to the one or more external devices;
    a display non-movably attached to the housing and configured to visually display information in four presentation orientations relative to the housing;
    an orientation sensor coupled to the housing and configured to detect the selected installation orientation;
    at least one current sensor coupled to the housing, at any one time at least one current sensor being configured to exist in a particular one of a plurality of states based upon a different current associated with the system; and
    a microprocessor coupled to the housing, the microprocessor communicatively linked to the orientation sensor to receive input from the orientation sensor based upon the detected selected installation orientation, the microprocessor communicatively linked to the at least one current sensor to receive input from the at least one current sensor based upon the particular state)of the at least one current sensor, the microprocessor configured to select one of the four presentation orientations for the display based upon the input received from the orientation sensor and to send output to the display to visually display information based upon the input received from the at least one current sensor in the selected one of the four presentation orientations.

16. The system of claim 15 wherein each of the four presentation orientations for the display corresponds to at least one of a plurality of predetermined installation orientations for the housing, and wherein the microprocessor selects one of the four presentation orientations for the display based upon the one of the predetermined installation orientations closest to the detected selected installation orientation.

17. The system of claim 15 wherein the at least one power input cable is configured to supply a plurality of phases of the electrical power, each of a group of the plurality of receptacles is configured to receive the electrical power with one of the phases supplied by the power input cable, and the at least one current sensor includes a different current sensor for each of the plurality of phases of the electrical power supplied by the power input cable.

18. The system of claim 15 wherein the at least one power input cable includes a plurality of power input cables, each configured to supply one of a plurality of phases of the electrical power, each of a group of the plurality of receptacles is configured to receive the electrical power with one of the phases supplied by the plurality of power input cables, and the at least one current sensor includes a different current sensor for each of the plurality of phases of the electrical power supplied by the plurality of power input cables.

19. The system of claim 15, wherein the four presentation orientations comprise a first presentation orientation, a second presentation orientation, a third presentation orientation, and a fourth presentation orientation, the second presentation orientation being inverted relative to the first presentation orientation, and the first presentation orientation being substantially orthogonal to the third presentation orientation.

20. A system to provide electrical power to at least one external device, the system comprising:
a housing configured to have a selected installation orientation chosen from a plurality of installation orientations;
at least one power input cable coupled to the housing and couplable to receive electrical power;
a plurality of receptacles coupled to the housing and coupled to receive electrical power from the at least one power input cable, the plurality of receptacles couplable to provide the electrical power to the at least one external device;
a segmented display non-movably attached to the housing and configured to visually display information in a first presentation orientation and a second presentation orientation, the segmented display including at least one segmented readout having a first LED unit with a first seven segment display and a first decimal point and a second LED unit with a second seven segment display and a second decimal point, the second LED unit being inverted relative to the first LED unit such that when the first LED unit is positioned upright the first decimal point is positioned in the lower right of the first seven segment display, and the second decimal point is positioned in the upper left of the second seven segment display;
an orientation sensor coupled to the housing, the orientation sensor configured to exist in a plurality of states, each corresponding to one of the plurality of installation orientations of the housing, at any one time the orientation sensor configured to exist in a particular one of the plurality of states corresponding to the selected installation orientation of the housing;
at least one current sensor coupled to the housing, the at least one current sensor configured to exist in a plurality of states, at any one time the at least one current sensor configured to exist in a particular one of the plurality of states based upon the current associated with the system; and
a microprocessor coupled to the housing, the microprocessor communicatively linked to the orientation sensor to receive input from the orientation sensor based upon the particular state of the orientation sensor, the microprocessor communicatively linked to the at least one current sensor to receive input from the at least one current sensor based upon the particular state of the at least one current sensor, the microprocessor configured to select one of the first and second presentation orientations for the segmented display based upon the input received from the orientation sensor and to send output to the display to visually display information based upon the input received from the at least one current sensor in the selected one of the first and second presentation orientations.

21. The system of claim 20 wherein the at least one power input cable includes a plurality of power input cables, each configured to supply one of a plurality of phases of the electrical power, the plurality of receptacles includes a receptacle for each phase of the electrical power being supplied by the power input cables, and the at least one current sensor includes a different current sensor for each of the plurality of phases of the electrical power supplied by the plurality of power input cables.

22. The system of claim 20 wherein the at least one input power cable is configured to supply a plurality of phases of the electrical power, each of a group of the plurality of receptacles is configured to receive the electrical power with one of the phases supplied by the power input cable, and the at least one current sensor includes a different current sensor for each phase of the plurality of phases of the electrical power supplied by the power input cable.

23. A method comprising:
selecting an installation orientation for a housing, the installation orientation being chosen from a plurality of possible installation orientations;
receiving electrical power through a power input;
providing the electrical power to at least one external device through at least one power output;
providing a display configured to visually display information in four presentation orientations;
determining a closest one of the four presentation orientations of the display to a right-side-up presentation based upon the installation orientation selected for the housing;
providing a present condition state based upon a condition associated with the providing the electrical power through the power output; and
visually displaying information based upon the present condition state on the display with the determined presentation orientation of the display.

24. The method of claim 23 wherein the at least one power output comprises a plurality of receptacles.

25. The method of claim 24 wherein providing electrical power through the plurality of receptacles includes for each phase of the electrical power provided, providing electrical power through a different one of the plurality of receptacles.

26. The method of claim 23 wherein the receiving electrical power includes receiving electrical power through at least one power input cable.

27. The method of claim 23 wherein providing a present condition state includes providing a condition state of the level of electrical current associated with providing the electrical power through the power output.

28. The method of claim 23 wherein providing the display includes a display with at least one matrix readout of one of the following types: dot-matrix LED and graphic LCD.

29. The method of claim 23 wherein providing the display includes a display with at least one segmented readout.

30. The method of claim 23 wherein providing a present condition state is related to one of the following: electrical current, humidity, and temperature.

31. The method of claim 23, wherein the four presentation orientations comprise a first presentation orientation, a second presentation orientation, a third presentation orientation, and a fourth presentation orientation, the second presentation orientation being inverted relative to the first presentation orientation, and the first presentation orientation being substantially orthogonal to the third presentation orientation.

32. A power distribution unit mountable on an external structure in a selected installation orientation, the power distribution unit comprising:
  means for receiving electrical power;
  a plurality of receptacles powered by the means for receiving electrical power, each of the plurality of receptacles being operable to supply power to at least one external device;
  a display configured to visually display information in four presentation orientations;
  an orientation sensor configured to sense the power distribution unit is in the selected installation orientation;
  a second sensor configured to sense a condition related to the power distribution unit; and
  a microprocessor communicatively linked to the orientation sensor to receive input from the orientation sensor indicating the power distribution unit is in the selected installation orientation, the microprocessor communicatively linked to the second sensor to receive input from the second sensor based upon the sensed condition, the microprocessor configured to select one of the four presentation orientations for the display based upon the input received from the orientation sensor and to send output to the display to visually display information based upon the input received from the second sensor in the selected one of the four presentation orientations.

33. The power distribution unit of claim 32, wherein the second sensor comprises at least one of a current sensor, a temperature sensor, and a humidity sensor.

34. The power distribution unit of claim 32, wherein the condition related to the power distribution unit is at least one of an electrical current level, a temperature, and a humidity.

35. The power distribution unit of claim 32, wherein the four presentation orientations comprise a first presentation orientation, a second presentation orientation, a third presentation orientation, and a fourth presentation orientation, the second presentation orientation being inverted relative to the first presentation orientation, and the first presentation orientation being substantially orthogonal to the third presentation orientation.

* * * * *